United States Patent
Huang et al.

(10) Patent No.: US 10,179,867 B2
(45) Date of Patent: Jan. 15, 2019

(54) RESIN COMPOSITIONS FOR THERMOSETTING POWDER COATING COMPOSITIONS

(75) Inventors: Rubin Huang, Echt (NL); Jurjen Bolks, Echt (NL); Paulus Franciscus Anna Buijsen, Echt (NL); Juul Cuijpers, Echt (NL); Jean-Paul Van Bregt, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 475 days.

(21) Appl. No.: 14/007,092

(22) PCT Filed: Mar. 22, 2012

(86) PCT No.: PCT/EP2012/055100
§ 371 (c)(1),
(2), (4) Date: Jan. 13, 2014

(87) PCT Pub. No.: WO2012/130722
PCT Pub. Date: Oct. 4, 2012

(65) Prior Publication Data
US 2014/0234642 A1   Aug. 21, 2014

(30) Foreign Application Priority Data
Mar. 25, 2011 (EP) .................................. 11159836

(51) Int. Cl.
| | |
|---|---|
| *B32B 27/08* | (2006.01) |
| *B32B 27/18* | (2006.01) |
| *B32B 27/26* | (2006.01) |
| *B32B 27/36* | (2006.01) |
| *B32B 37/24* | (2006.01) |
| *C09D 5/03* | (2006.01) |
| *C09D 167/00* | (2006.01) |
| *C09D 167/02* | (2006.01) |
| *C09D 167/03* | (2006.01) |
| *C08L 67/00* | (2006.01) |
| *C08L 67/02* | (2006.01) |
| *C08L 67/03* | (2006.01) |
| *C08J 3/12* | (2006.01) |
| *C08J 3/20* | (2006.01) |
| *C08J 3/24* | (2006.01) |

(Continued)

(52) U.S. Cl.
CPC ......... *C09D 167/02* (2013.01); *C08G 63/183* (2013.01); *C08G 63/20* (2013.01); *C08K 5/49* (2013.01); *B05D 3/02* (2013.01); *B05D 2401/32* (2013.01); *B05D 2508/00* (2013.01); *B29B 9/02* (2013.01); *B29B 13/04* (2013.01); *B29B 13/10* (2013.01); *B29B 2911/14286* (2013.01); *B29C 2037/0039* (2013.01); *B32B 15/09* (2013.01); *B32B 27/08* (2013.01); *B32B 27/18* (2013.01); *B32B 27/26* (2013.01); *B32B 27/36* (2013.01); *B32B 37/24* (2013.01); *B32B 2250/02* (2013.01); *B32B 2255/06* (2013.01); *B32B 2255/26* (2013.01); *B32B 2367/00* (2013.01); *C08G 63/12* (2013.01); *C08G 63/123* (2013.01); *C08G 63/127* (2013.01); *C08G 63/137* (2013.01); *C08G 63/16* (2013.01); *C08G 63/18* (2013.01); *C08G 63/181* (2013.01); *C08G 63/199* (2013.01); *C08J 3/12* (2013.01); *C08J 3/20* (2013.01); *C08J 3/24* (2013.01); *C08K 5/0025* (2013.01); *C08K 5/17* (2013.01); *C08K 5/51* (2013.01); *C08K 5/53* (2013.01); *C08K 5/5313* (2013.01); *C08L 67/00* (2013.01); *C08L 67/02* (2013.01); *C08L 67/03* (2013.01); *C09D 5/03* (2013.01); *C09D 167/00* (2013.01); *C09D 167/03* (2013.01); *Y10T 428/31681* (2015.04); *Y10T 428/31786* (2015.04); *Y10T 428/31794* (2015.04)

(58) Field of Classification Search
None
See application file for complete search history.

(56) References Cited

U.S. PATENT DOCUMENTS

| | | | | |
|---|---|---|---|---|
| 3,842,021 | A | * 10/1974 | Grant et al. ............ | C08L 67/00 428/402 |
| 4,147,737 | A | 4/1979 | Sein et al. | |

(Continued)

FOREIGN PATENT DOCUMENTS

| | | |
|---|---|---|
| EP | 0 600 546 | 6/1994 |
| EP | 1 067 159 | 1/2001 |

(Continued)

OTHER PUBLICATIONS

International Search Report for PCT/EP2012/055100, dated Jun. 4, 2012.

(Continued)

*Primary Examiner* — Vivian Chen
(74) *Attorney, Agent, or Firm* — Nixon & Vanderhye P.C.

(57) ABSTRACT

The invention relates to a resin composition comprising at least an organophosphorous compound and a branched amorphous carboxylic acid functional polyester, said polyester having a $T_g$ of at least 40° C., said polyester comprising at least 1 to 45% mol of 2,2-dimethyl-1,3-propanediol; a $C_3$ to $C_5$ aliphatic diol AD1 not including 2,2-dimethyl-1,3-propanediol; a $C_6$ to $C_{50}$ aliphatic or cycloaliphatic diol AD2; 0.1 to 10% mol of an at least trifunctional monomer; 1 to 55% mol of terephthalic acid, wherein the % mol is based on the polyester. The powder coatings of the present invention derived upon curing at low temperature of the thermosetting powder coating compositions of the invention that were storage stable and comprised said resin composition and a crosslinker having functional groups that are reactive with the carboxylic acid groups of the polyester, have limited or no blooming, good smoothness sufficient reverse impact resistance and preferably have also good degassing limit.

30 Claims, No Drawings

(51) Int. Cl.
*B29B 9/02* (2006.01)
*B29B 13/04* (2006.01)
*B29B 13/10* (2006.01)
*B05D 3/02* (2006.01)
*C08K 5/49* (2006.01)
*C08K 5/51* (2006.01)
*C08K 5/53* (2006.01)
*C08K 5/5313* (2006.01)
*C08K 5/17* (2006.01)
*C08G 63/12* (2006.01)
*C08G 63/123* (2006.01)
*C08G 63/127* (2006.01)
*C08G 63/137* (2006.01)
*C08G 63/16* (2006.01)
*C08G 63/18* (2006.01)
*C08G 63/181* (2006.01)
*C08G 63/183* (2006.01)
*C08G 63/199* (2006.01)
*C08G 63/20* (2006.01)
*B32B 15/09* (2006.01)
*B29C 37/00* (2006.01)
*C08K 5/00* (2006.01)

(56) References Cited

U.S. PATENT DOCUMENTS

| | | | | |
|---|---|---|---|---|
| 4,197,353 A * | 4/1980 | Tobias | C08G 18/4219 | 428/458 |
| 4,200,566 A * | 4/1980 | FitzGerald | C08G 81/00 | 428/458 |
| 4,340,698 A * | 7/1982 | De Jongh | C08G 59/686 | 525/438 |
| 4,740,580 A * | 4/1988 | Merck | C08G 63/183 | 525/438 |
| 4,801,680 A * | 1/1989 | Geary | C09D 167/00 | 525/418 |
| 4,968,775 A * | 11/1990 | Toman | C09D 167/02 | 525/437 |
| 5,373,084 A * | 12/1994 | Chang | C08G 63/20 | 525/437 |
| 5,418,309 A * | 5/1995 | Tanabe | C08G 18/4211 | 524/904 |
| 5,439,988 A * | 8/1995 | Moens | C08G 63/199 | 525/437 |
| 5,637,654 A * | 6/1997 | Panandiker | C09D 167/02 | 525/302 |
| 5,639,560 A * | 6/1997 | Moens | C08F 290/061 | 428/482 |
| 5,728,779 A * | 3/1998 | van de Werff | C09D 163/00 | 525/113 |
| 6,114,489 A * | 9/2000 | Vicari | C08G 18/4202 | 428/423.1 |
| 6,284,845 B1 * | 9/2001 | Panandiker | C09D 167/00 | 525/438 |
| 6,380,279 B1 * | 4/2002 | Moens | C08L 67/07 | 427/508 |
| 6,437,045 B1 | 8/2002 | Rickert et al. | | |
| 6,537,620 B1 * | 3/2003 | Thiele | B05D 3/0263 | 427/195 |
| 6,635,721 B1 * | 10/2003 | Moens | C09D 167/00 | 427/385.5 |
| 6,660,398 B1 * | 12/2003 | Moens | C09D 167/00 | 427/189 |
| 6,881,769 B1 * | 4/2005 | Grob | C09D 5/032 | 523/400 |
| 8,637,581 B2 * | 1/2014 | Moens | C08G 63/672 | 521/48.5 |
| 9,169,419 B2 * | 10/2015 | Buijssen | C09D 167/00 | |
| 2003/0153640 A1 * | 8/2003 | Moens | C09D 167/02 | 522/65 |
| 2003/0166793 A1 * | 9/2003 | Moens | C09D 167/02 | 525/444 |
| 2004/0002559 A1 * | 1/2004 | Troutman | C09D 5/185 | 524/100 |
| 2004/0071955 A1 * | 4/2004 | Moens | C09D 167/00 | 428/327 |
| 2004/0087736 A1 * | 5/2004 | Wu | C08G 63/199 | 525/438 |
| 2005/0123764 A1 * | 6/2005 | Hoffmann | B05D 3/207 | 428/409 |
| 2005/0171300 A1 * | 8/2005 | Moens | C09D 167/02 | 525/438 |
| 2006/0194929 A1 * | 8/2006 | Moens | C08G 63/672 | 525/437 |
| 2006/0219520 A1 * | 10/2006 | Sansevero | B66B 27/00 | 198/324 |
| 2008/0220178 A1 * | 9/2008 | Moens | C08L 67/02 | 427/458 |
| 2010/0120978 A1 * | 5/2010 | Minesso | C08G 63/20 | 524/602 |
| 2010/0310801 A1 * | 12/2010 | Moens | C09D 167/02 | 428/35.8 |
| 2010/0311896 A1 * | 12/2010 | Cavalieri | C09D 167/02 | 524/513 |
| 2012/0109629 A1 * | 5/2012 | Yassa | G06F 17/2854 | 704/2 |
| 2012/0220676 A1 * | 8/2012 | Moens | C08G 63/672 | 521/48.5 |
| 2012/0231283 A1 * | 9/2012 | Buijsen | C08G 63/20 | 428/458 |

FOREIGN PATENT DOCUMENTS

| | | |
|---|---|---|
| WO | WO93/04122 | 3/1993 |
| WO | WO98/06772 | 2/1998 |
| WO | WO00/23530 | 4/2000 |
| WO | WO2004/083326 | 9/2004 |
| WO | WO2009/095460 | 8/2009 |
| WO | WO2010/094811 | 8/2010 |
| WO | WO2010/125105 | 11/2010 |

OTHER PUBLICATIONS

Brochure "Advanced Materials-Powder additives" from Huntsman Corp.pp. 24-25, (2007).

* cited by examiner

RESIN COMPOSITIONS FOR THERMOSETTING POWDER COATING COMPOSITIONS

This application is the U.S. national phase of International Application No. PCT/EP2012/055100, filed 22 Mar. 2012, which designated the U.S. and claims priority to EP Application No. 11159836.3, filed 25 Mar. 2011, the entire contents of each of which are hereby incorporated by reference.

The invention relates to a resin composition comprising a polyester and a organophosphorous compound chemically distinct from the polyester. The invention further relates to thermosetting powder coating compositions comprising said resin composition and a crosslinker with functional groups capable of reacting with the polyester. The invention also relates to powder coatings prepared from said thermosetting powder compositions, a substrate coated with said thermosetting powder coating compositions and to the use of the organophosphorous compound or of the polyester or of the resin compositions in thermosetting powder coating compositions that are storage stable, can be cured at low temperatures and can provide powder coatings that have no blooming, good smoothness, sufficient reverse impact resistance (RIR) and preferably have also good degassing limit.

Powder coating compositions which are dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions (or commonly also known as powders) are also clean and convenient to use since they are applied in a clean manner over the substrate because they are in dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically finely divided particles of a polymer, and a crosslinker in case of a thermosetting powder coating composition, that also usually contain pigments, fillers, and other additives. After application to the substrate, the individual powder particles are melted in an oven and coalesce to form a continuous film typically known as a powder coating having decorative and protective properties associated with conventional organic coatings. Methods of application of powder coating compositions are considered to be fusion-coating processes; that is, at some time in the coating process the powder particles must be fused or melted. Although this is usually carried out in a convection oven, infrared, resistance, and induction heating methods have also been used. Therefore, with minor exceptions, powder coatings are factory applied in fixed installations, essentially excluding their use in maintenance applications. Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded object to be coated. The object usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The present invention relates to the field of thermosetting powder coating compositions. The preparation of thermosetting powder coating compositions is described by Misev in "Powder Coatings, Chemistry and Technology" (pp. 224-300; 1991, John Wiley).

Powder coating compositions are frequently separated into decorative and functional grades. Decorative grades are generally finer in particle size and color and appearance are important. They are applied to a cold substrate using electrostatic techniques at a relatively low film thickness, e.g., 20-75 μm. Functional grades are usually applied in thick films, e.g., 200-1000 μm, using fluidized-bed, flocking, or electrostatic spray coating techniques to preheated parts. Corrosion resistance and electrical, mechanical, and other functional properties are more important in functional coatings. Another distinction of powder coating compositions is that between indoor (interior) and outdoor (exterior) grades. Outdoor grades present typically improved weatherability over the indoor grades.

A major class of interior grade powder coating compositions is based on a combination of an acid functional polyester resin and an epoxy resin, commonly known also as "hybrid" powder coating compositions. Epoxy resins or commonly known as epoxies or epoxy compounds, are an important class of polymeric materials, characterized by the presence of more than one three-membered ring known as the epoxy, epoxide, oxirane, or ethoxyline group. The terms epoxy compounds or epoxy resins or epoxies will be used interchangeably in the context of the present invention. Epoxy resins are one of the most versatile classes of chemical compounds that have gained wide acceptance as materials of choice for a multitude of coatings applications.

Due to their method of application that involves at some point in time heating at a temperature required to melt and cure a thermosetting powder coating composition, the substrate must be able to withstand this temperature, limiting the application of powder coating compositions to metal, ceramic, and glass substrates for the most part.

In order to comply with more stringent environmental regulations, there has been increased attention to the development of thermosetting powder coating compositions that can be cured at low temperatures. A decrease in temperature at which a thermosetting powder coating composition can be cured is desired as this is economically, environmentally and technically advantageous. A decrease in cure temperature, while keeping the cure time constant, reduces the energy consumption, which is beneficial both from an ecological and an economical point of view, rendering at the same time this type of thermosetting powder coating compositions attractive to powder coaters since the throughput of their powder coating lines may also be significantly increased. Furthermore, due to a decrease of cure temperature, heat-sensitive substrates may also be used, thereby broadening the field of application for such a thermosetting powder coating composition.

Moreover, due to the high cost of coating compositions based only on mixtures of epoxy resins, it is desirable to replace part of the epoxy resins with another type of polymer that is cheaper to produce such as for example a polyester without compromising the performance of the end coating.

EP 1 067 159 A1 discloses thermosetting compositions for powder coatings comprising a linear or branched carboxylic acid group containing isophtalic acid rich polyester, a linear or branched hydroxyl group containing polyester and a curing agent system having functional groups reactive with the polyester carboxylic acid groups and the hydroxyl groups, characterised in that the carboxylic group containing isophtalic acid rich polyester is amorphous and the hydroxyl group containing polyester is semi-crystalline.

U.S. Pat. No. 6,660,398 B1 discloses powder thermosetting coating compositions comprising a binder which comprises a blend of:
  (a) an amorphous polyester containing carboxyl groups, rich in isophthalic acid, prepared from an acid constituent comprising from 55 to 100 mol % of isophthalic acid, from 0 to 45 mol % of at least one dicarboxylic acid other than isophthalic acid and from 0 to 10 mol % of a polycarboxylic acid containing at least 3 carboxyl groups and from an alcohol constituent comprising from 60 to 100 mol % of neopentylglycol, from 0 to 40 mol % of at least one dihydroxylated compound other than neopentylglycol and from 0 to 10 mol % of a polyhydroxylated compound containing at least three hydroxyl groups, the said amorphous polyester having a glass transition temperature (Tg) of at least 50° C. and an acid number of 15 to 100 mg of
  (b) a semicrystalline polyester containing carboxyl groups prepared either (b1) from 1,12-dodecanedioic acid and from a saturated aliphatic diol with a linear chain having from 2 to 16 carbon atoms and optionally from a polycarboxylic acid containing at least 3 carboxyl groups or from a polyol containing at least 3 hydroxyl groups, or (b2) from 40 to 100 mol % of 1,12-dodecanedioic acid and from 0 to 60 mol percent of an aliphatic dicarboxylic acid with a linear chain having from 4 to 9 carbon atoms, calculated with respect to the total of the dicarboxylic acids, from a cycloaliphatic diol having from 3 to 16 carbon atoms and optionally from a polycarboxylic acid having at least 3 carboxyl groups or from a polyol having at least 3 hydroxyl groups, the said semicrystalline polyester having a melting point (Tm) of at least 40° C. and an acid number of 5 to 50 mg of KOH/g; and
  (c) a crosslinking agent.

EP 0 600 546 A1 discloses a binder composition for thermosetting powder coatings comprising (i) a polymer such as a polyester, a polyacrylate or a bisphenol based polyether, capable of reacting with epoxy groups and (ii) a crosslinker containing epoxy groups.

Therefore, there is a desire for a thermosetting powder coating composition that has the ability to be cured at a low temperature of for example in the range of from 110 up to and including 225° C., preferably for times of up to and including 60 minutes and that is storage stable. Besides the desire for a storage stable thermosetting powder coating composition that can be cured at low temperature (curing at low temperature is also referred to herein as low bake) it is also desired that the powder coatings prepared from low bake powder coating compositions have an array of properties such as for example limited or no blooming, good smoothness, sufficient reverse impact resistance, preferably also good degassing limit and said powder coatings are also economically attractive.

Powder coatings resulting from low bake thermosetting powder coating compositions may however display poor physical and/or mechanical properties such as for example poor smoothness and/or poor reverse impact resistance due to inadequate cure and/or have extensive blooming and/or have bad degassing limit. Particularly, the development of surface haze due to blooming may become a significant problem. Blooming usually manifests itself as surface haze which is usually inspected by the naked eye and assessed qualitatively. The range at which deposition of white or off-white material occurs and manifests as surface haze is reported. This visual inspection may be carried out on either white or dark colored coatings. According to Focus on Powder Coatings, vol. 2003 (6), June 2003, p. 3-4 and the reference to the paper entitled "The Development of Non-blooming Polyester Resin and its Application to Low Temperature Cure Powder Coatings" by Navin Shah and Edward Nicholl of Rohm & Haas Powder Coatings, presented at the International Waterborne, High Solids and Powder Coatings Symposium held in New Orleans on 26-28 Feb. 2003, blooming of a polyester has been attributed to the presence of a 22-member cyclic oligomer formed by the condensation of two molecules of terephthalic acid and two molecules of neopentyl glycol. This 22-member cyclic oligomer possesses a crystalline melting temperature of about 275-280° C. and normally does not volatize at low curing temperatures, for instance curing temperatures ranging from 120° C. to 160° C.

It is therefore the object of the invention to provide storage stable, low bake thermosetting powder coating compositions comprising a polyester and a crosslinker that has functional groups that are reactive with the functional groups of the polyester, said thermosetting powder coating compositions upon curing provide powder coatings, said powder coatings having limited or preferably no blooming, good smoothness, sufficient reverse impact resistance (RIR) and preferably also good degassing limit.

This object is achieved by a resin composition comprising at least:
a. an organophosphorous compound; and
b. a branched amorphous carboxylic acid functional polyester, said polyester having a Tg of at least 40° C. as measured by Differential Scanning calorimetry at a heating rate of 5° C./min, wherein said polyester comprises polycondensed residues derived from at least the following monomers:
bi) 1 to 45% mol of 2,2-dimethyl-1,3-propanediol;
bii) a $C_3$ to $C_5$ aliphatic diol AD1 not including 2,2-dimethyl-1,3-propanediol;
biii) a $C_6$ to $C_{50}$ aliphatic or cycloaliphatic diol AD2;
biv) 0.1 to 10% mol of an at least trifunctional monomer;
bv) 1 to 55% mol of terephthalic acid;
wherein the % mol is based on the polyester.

In addition the invention further provides for a resin composition according to claim 1.

The resin compositions of the invention when used in thermosetting powder coating compositions, the latter are storage stable and can be cured at temperatures as low as 170° C., preferably 160° C., more preferably 150° C. even more preferably 140° C. for at most 30 minutes, preferably at most 15 minutes, to afford powder coatings that have limited or preferably no blooming, good smoothness, sufficient reverse impact resistance (RIR) and preferably also good degassing limit (as measured according to ASTM D 714 and the description herein) and good 20°/60° specular gloss (as measured at 20° or 60° according to ASTM D523).

Additional advantages of the thermosetting powder coating compositions comprising the resin compositions of the invention may be that the thermosetting powder coating compositions have an improved cost-effectiveness good storage stability [equal or higher to 6, on a scale from 1 (very poor storage stability) up to 10 (excellent storage stability)] as measured using DIN 55 990-7 at 40° C. after 28 days. Moreover, such thermosetting powder coating compositions offer to manufacturers of metal coated articles the possibility to increase productivity and throughput of their coating lines, thus directly establishing a more cost-effective commercially and environmentally attractive solution.

Unless the context clearly indicates otherwise, as used herein plural forms of the terms herein (for example composition, component, resin, polymer,) are to be construed as including the singular form and vice versa.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The terms "effective", "acceptable", "active" and/or 'suitable' (for example with reference to any process, use, method, application, preparation, product, material, formulation, compound, composition, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

The term "comprising" as used herein means that the list that immediately follows is non exhaustive and may or may not include any other additional suitable items, for example one or more further feature(s), component(s), ingredient(s) and/or substituent(s) as appropriate. "Substantially comprising" as used herein means a component or list of component(s) is present in a given material in an amount greater than or equal to about 90% w/w, preferably greater than or equal to 95% w/w, more preferably greater than or equal to 98% w/w of the total amount of the given material. The term "consisting of" as used herein mean that the list that follows is exhaustive and does not include additional items.

By "thermosetting powder coating compositions" is meant herein, a mixture of components and which compositions have the ability to form an irreversible crosslinked network (the so-called 'cured form') upon curing, preferably heat curing. In the thermosetting composition of the present invention, crosslinking will proceed via the formation of permanent covalent bonds via chemical reactions involving the carboxylic acid functional groups of the polyester of the invention and the functional groups, like oxirane groups or β-hydroxyalkylamide groups, of a crosslinker that is reactive with the polyester. As a result of these crosslinking reactions the cured form of the thermosetting composition becomes set material, that is, a material that can no longer flow, be melted or dissolved. For convenience unless the context clearly indicates otherwise the term "material" as used herein may also denote a cured thermosetting composition suitable for use as a material optionally with other components.

In the context of the present invention thermosetting powder coating compositions that are rated with at least 6 on a scale from 1 (very poor storage stability) up to 10 (excellent storage stability)] as measured using DIN 55 990-7 at 40° C. after 28 days, are regarded as having good storage stability.

By "low bake thermosetting powder coating compositions" is meant herein said compositions that upon curing at a temperature in the range of from 140° C. up to 160° C. for at most 30 min, preferably upon curing for 10 min at 160° C. provide powder coatings that withstand 60 inch/lbs at a film thickness of 75 μm using the method for measuring RIR as described herein.

In the context of the present invention, with "a powder coating that shows limited or no blooming" is meant a powder coating that presents limited or no blooming if prepared from a thermosetting powder coating composition cured at a temperature higher than 140° C. as measured using the assessment as described herein. With 'blooming' is meant the phenomenon of the formation of a white or off-white powder or crust on the surface of a coating during cure. The blooming was assessed visually as described herein. For the thermosetting powder coating compositions of the invention comprising the resin compositions of the invention, their corresponding powder coatings presented limited or preferably no blooming at curing temperatures higher than 140° C.

In literature, the term "smoothness" is also referred to as "flow". The smoothness of the powder coatings derived upon full cure of the corresponding thermosetting powder coating compositions of the present invention was determined by visually comparing the smoothness of the coating with PCI Powder Coating Smoothness panels [ACT Test Panels Inc., APR22163 (A) Batch: 50708816] at a coating thickness of approximately 60 μm. The rating of smoothness is from PCI 1 to PCI 10, with PCI 1 representing the roughest coating and PCI 10 representing the smoothest coating. For the thermosetting powder coating compositions of the invention, their corresponding powder coatings presenting smoothness equal or higher to PCI 2, are desirable. As presented herein, good smoothness of a powder coating is a smoothness of at least PCI 2, preferably of at least PCI 3, more preferably of at least PCI 4, even more preferably of at least PCI 5.

Reverse impact resistance (RIR) (inch/lbs, 1 inch/lbs=0.055997 m/kg) of a powder coating obtained by curing of a thermosetting powder coating composition at a certain temperature and time, is defined as the ability of a 75 µm thick powder coating prepared from the thermosetting powder coating composition of the invention on S-46 panels of 0.8 mm thickness to withstand impact of 160 inch/lbs as measured using a ⅝" ball ("pass" according to ASTM D 2794). RIR is measured using ASTM D2794 according to the method as described herein. A "Pass" in the row for RIR indicates that the powder coating could withstand the impact (showed no cracks or delamination) when the corresponding thermosetting powder coating composition was cured for 10 minutes at 160° C. A "Fail" indicates that the coating did not withstand the impact (showed cracks or delamination) With sufficient reverse impact resistance of a powder coating is meant that the powder coatings withstand the reverse impact resistance test (as described herein) when cured for only 10 minutes at 160° C.

The degassing limit of a thermosetting powder coating composition of the present invention was measured according to ASTM D 714 as described herein. The degassing limit of a thermosetting powder coating composition is measured on the powder coating prepared therefrom and is expressed in coating thickness (µm). The degassing limit is reported as the layer thickness (µm) from which blisters, pinholes or other coating surface defects start to be visible to the naked eye. Higher values for the degassing limit are preferred to lower values. In the context of the present invention, good degassing limit is one of at least equal or higher to 90 µm.

By "powder" or equivalently "powdered" is meant herein, a solid substance reduced to a state of fine, loose particles wherein the individual particles have a maximum particle size of at most 100 µm at 23° C. and at atmospheric pressure, for example a particle size of at most 90 µm at 23° C. A particle is defined as a small object that: a) has dimensions as described herein after and b) behaves as a whole unit in terms of its transport and properties. The particle size distribution (PSD) of a powder, is a list of values or a mathematical function that defines the relative amounts of particles present, sorted according to size. The terms "particle size" and "particle size distribution" will be used interchangeably in the context of the present invention when used in relation to a powder. The method used to measure the particle size of the granular material according to the present invention is sieve analysis. According to it, the powder is separated on sieves of different sizes. Thus, the PSD is defined in terms of discrete size ranges: e.g. "% of sample powder has particle size in the range of 10 microns to 20 microns", when sieves of these sizes are used.

By "pulverizing" is meant herein the process to make a material into a powder.

A "resin" is herein understood to have the same meaning as it has to a skilled person in thermosetting chemistry, namely as a low molecular weight polymer having reactive groups. The term low molecular weight means a molecular weight lying between a few hundred g/mole, e.g. 1000, and a few thousand g/mol, e.g. 10,000. Ideally the number of reactive groups per molecule is at least two.

By "composition" is meant therein the combining of distinct chemical substances to form a whole. It will be understood that the total sum of any quantities expressed herein as percentages cannot (allowing for rounding errors) exceed 100%. For example the sum of all components of which the composition of the invention (or part(s) thereof) comprises may, when expressed as a weight (or other) percentage of the composition (or the same part(s) thereof), total 100% allowing for rounding errors. However where a list of components is non exhaustive the sum of the percentage for each of such components may be less than 100% to allow a certain percentage for additional amount(s) of any additional component(s) that may not be explicitly described herein.

By "resin composition" is meant herein the combining of a resin as defined herein and of at least another distinct chemical substance.

By "dry" resin or polyester or composition is meant herein that the resin or polyester or composition does not contain any deliberately added water or moisture but any of them may contain moisture absorbed from the atmosphere in an amount of up to 30, preferably up to 20% w/w based on the weight of the resin or polyester or composition, respectively.

By "room temperature" is meant herein a temperature of 23° C.

By "curing" is meant herein the process of becoming "set" that is, a material that can no longer flow, be melted or dissolved. Herein, the term "curing" is used interchangeably with the term "cure". Preferably, the curing of the thermosetting composition of the present invention takes place using heat and in that case the curing can be called "heat curing" (for clarity, the term heat does not include UV- or electron beam induced curing). Optionally, a combination of heat and pressure can be used to cure the thermosetting compositions of the present invention. In the context of the present invention, the term "heat curing" does not exclude the application of pressure along with heat in order to cure the thermosetting compositions of the present invention.

By "article" is meant herein an individual object or item or element of a class designed to serve a purpose or perform a special function and can stand alone. For example an article can be a substrate. Exemplary substrates include but are not limited to non-heat sensitive substrates such as glass, ceramic, fibre cement board, or metal, for example aluminum, copper, steel, or heat-sensitive substrates such as wood for example low density fibre board, medium density fibreboard and high density fibreboard, plastic, etc., or combinations thereof.

In the context of the present invention with carboxylic acid functional polyester is meant a polyester which predominantly has carboxylic acid functional groups. A carboxylic acid functional polyester has an acid value that is higher than its hydroxyl value. Generally, a carboxylic acid functional polyester has an acid value between 14 and 120 mg KOH/g polyester whilst the hydroxyl value of the polyester is less than 13 mg KOH/g polyester. For clarity, the OHV of a hydroxyl functional polyester is higher than its AV. The acid (AV) and hydroxyl value (OHV) of a polyester can be measured titrimetrically according to ISO 2114-2000 and ISO 4629-1978, respectively. A carboxylic acid functional polyester may be prepared by selecting the synthesis conditions and the ratio of alcohols and carboxylic acids or anhydrides such that there is an excess of carboxylic acid or anhydride over alcohol so as to form a polyester which has terminal carboxylic acid and/or carboxylic acid anhydride groups.

By "functional groups" is meant herein a covalently bonded group of atoms within a molecule, such as for example the carboxyl group in a carboxylic acid or the hydroxyl group in an alcohol or the oxirane group in an epoxy resin, that determines the chemical behaviour of said compound and are responsible for the characteristic chemical reactions of those molecules. In the case of a carboxylic acid functional polyester the functional groups of the polyester are those covalently bonded groups of atoms in the polyester that behave as a unit in chemical reactions and said groups are capable of reacting with the functional groups of crosslinker for example with the oxirane groups of an epoxy resin crosslinker. Typically in the case of a carboxylic acid functional polyester, the carboxylic acid functional groups are terminal groups (=end-groups) which are located at the end(s) of the polyester's macromolecular structure (including terminal groups on side chains which side chains form part of the main and longer—when compared to side chains—macromolecular chain) of each polyester molecule.

In the context of the present invention, the branched amorphous carboxylic acid functional polyester of the resin composition of the present invention, is referred to as 'the polyester'. The functional groups of the polyester are carboxylic acid or carboxylic acid anhydride terminal groups.

With 'branched' is meant a polyester having a functionality of at least equal or higher to 2.02 and of at most 10.

Cure is used interchangeably with the terms crosslinking or curing in the present invention while powder coating is the object derived upon cure of the thermosetting powder coating composition of the present invention. By "curing" is meant herein the process of becoming "set" material. Preferably, curing of the thermosetting powder coating composition takes place using thermal energy only. For clarity, in the context of the invention, the term thermal energy does not include UV- or electron beam induced curing. Thermal energy cure is used interchangeably with the term heat cure or thermal cure.

By "powder" is meant herein, a collection of solid particles wherein the individual particles have a maximum particle size of at most 130 μm at 23° C., for example a particle size of at most 110 μm, for example of at most 90 μm at 23° C.

The term 'powder coating' as used herein is the partially or fully cured (crosslinked) form of the thermosetting powder coating composition of the invention. In other words the powder coating derives upon partial or full cure of the thermosetting powder coating composition.

The Resin Composition

In the context of the present invention, the resin composition comprises at least
  a. an organophosphorous compound and
  b. a branched amorphous carboxylic acid functional polyester that has certain particular features.

Preferably, the resin composition of the invention is solid at 23° C. and at atmospheric pressure (=1 atm). Preferably the resin composition is dry, even more preferably the resin composition is dry and solid at 23° C. and at atmospheric pressure (=1 atm). Preferably the resin composition is particularly suitable for use in thermosetting powder coating compositions. More preferably the resin composition is particularly suitable for use in thermosetting powder coating compositions.

The Organophosphorous Compound of the Resin Composition

By "organophosphorous compound" is meant herein an organic compound of molecular weight lower than 1500 that contains a direct phosphorous carbon bond and said organophosphorous compound is chemically distinct from the polyester. Preferably the organophosphorous compound has a molecular weight lower than 1200, even more preferably lower than 1000, most preferably lower than 800, for example lower than 600.

Preferably the organophosphorous compound is selected from the group of phosphonium salts having at least one phosphorous carbon bond and/or organophosphines having at least one phosphorous carbon bond. Even more preferably the organophosphorous compound is selected from the group of quaternary phosphonium salts and/or tertiary organophosphines. Most preferably the organophosphorous compound is selected from the group of quaternary phosphonium halides and/or tertiary organophosphines. Especially the organophosphorous compound is a quaternary phosphonium salt comprising at least one phenyl group covalently bonded with phosphorous, more especially the organophosphorous compound is a quaternary phosphonium salt comprising at least two phenyl groups each one of them is covalently bonded to the same phosphorous, most especially the organophosphorous compound is a quaternary phosphonium salt comprising at least three phenyl groups each one of them is covalently bonded to the same phosphorous, for example the organophosphorous compound is triphenylethyl phosphonium halide, for example the organophosphorous compound is triphenylethyl phosphonium chloride, for example the organophosphorous compound is triphenylethyl phosphonium bromide.

The preferred counter anion in any of the above mentioned preferred group of organophosphorous compounds is a halide counter anion. Especially the preferred counter anion in a quaternary phosphonium salt is bromide or chloride.

Examples of quaternary phosphonium salts include but are not limited to dodecyltriphenyl phosphonium halides, decyltriphenyl phosphonium halides, octyldiphenyl phosphonium halides, trioctyl phosphonium halides, triphenylethyl phosphonium bromide, tetraphenylphosphonium chloride, tetramethylphosphonium iodide and mixtures thereof.

Organophosphines having at least one phosphorous carbon bond are alkyl and/or aryl and/or phenyl derivatives of phosphine. Tertiary organophosphines are compounds of the formula $R_3P$, wherein R is for example alkyl, aryl, phenyl group.

Examples of tertiary organophosphines include but are not limited to dodecyldiphenyl phosphine, decyldiphenyl phosphine, octyldiphenyl phosphine, trioctyl phospine, triphenyl phosphine and mixtures thereof. Preferably the tertiary phosphine is triphenyl phosphine and/or tritoluoyl phosphine.

The Amine and/or the Amine Salt of the Resin Composition

The resin composition may further comprise an amine and/or an amine salt that are chemically distinct from the organophosphorous compound and the polyester. The amine of the resin composition is preferably a tertiary amine and the amine salt of the resin composition is preferably a quaternary amine salt. Preferably the resin composition of the invention further comprises a tertiary amine and/or a quaternary ammonium salt.

Amines are organic compounds and derivatives of ammonia, wherein one or more hydrogen atoms have been replaced by an organic substituent such as for example an alkyl or aryl or phenyl group.

Tertiary amines arise when all three hydrogen atoms are replaced by organic substituents such as for example an alkyl or aryl or phenyl group. Examples of tertiary amines include but are not limited to octyldimethylamine, decyldimethylamine, dodecyldimethylamine, tetradecyldimethylamine, hexadecyldimethylamine (also known as palmityldimethylamine), octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine and mixtures thereof. Preferably the tertiary amine is hexadecyldimethyl amine and/or dodecyldimethyl amine and/or tetradecyl dimethyl amine, more preferably the tertiary amine is hexadecyldimethyl amine.

It is also possible to have four organic substituents on the nitrogen. These compounds are not amines but are called quaternary ammonium salts, have a charged nitrogen center, and have an anion. The preferred counter anion is a halide anion and the preferred halide ion in a quaternary ammonium salt is bromine or chlorine.

Examples of quaternary ammonium salts include but are not limited to octyltrimethyl ammonium halides, decyltrimethyl ammonium halides, dodecyltrimethyl ammonium halides, tetradecyltrimethyl ammonium halides, hexadecyltrimethyl ammonium halides, octadecyltrimethyl ammonium halides, didodecyldimethyl ammonium halides, ditetradecyldimethyl ammonium halides, dihexadecyldimethyl ammonium halides, ditallowalkyldimethyl ammonium halides, tetractyl ammonium halides, tetradecyl ammonium halides, tetradodecyl ammonium halides and mixtures thereof. Preferably the quaternary ammonium salt is hexadecyltrimethyl ammonium bromide and/or cetyl triethyl ammonium bromide and/or cetyl trimethyl ammonium bromide.

The amount of organophosphorous compound and any tertiary amine and/or quaternary ammonium salt present is in the range of from at least 0.05 to at most 5% w/w based on the total weight of polyester and organophosphorous compound; and any tertiary amine and/or quaternary ammonium salt present. Preferably the amount of organophosphorous compound and any tertiary amine and/or quaternary ammonium salt present is in the range of from at least 0.06 to at most 4% w/w based on the total weight of polyester and organophosphorous compound; and any tertiary amine and/or quaternary ammonium salt present. More preferably the amount of organophosphorous compound and any tertiary amine and/or quaternary ammonium salt present is in the range of from at least 0.08 to at most 3% w/w based on the total weight of polyester and organophosphorous compound; and any tertiary amine and/or quaternary ammonium salt present. Even more preferably the amount of organophosphorous compound and any tertiary amine and/or quaternary ammonium salt present is in the range of from at least 0.1 to at most 2% w/w based on the total weight of polyester and organophosphorous compound; and any tertiary amine and/or quaternary ammonium salt present.

The resin composition may comprise all possible mixtures of an organophosphorous compound and/or an amine and/or an amine salt including all above mentioned preferred compounds of these types of compounds, such as phosphonium salts, tertiary organophosphines, tertiary amines and quaternary ammonium salts and in particular all possible mixtures of the most preferred compounds such as the triphenylethyl phosphonium bromide, triphenyl phosphine tritoluoyl phosphine, hexadecyldimethyl amine, dodecyldimethyl amine, tetradecyl dimethyl amine, hexadecyltrimethyl ammonium bromide, cetyl triethyl ammonium bromide, cetyl trimethyl ammonium bromide.

The organophosphorous compound and any tertiary amine and/or quaternary ammonium salt present in the resin composition is preferably added to the polyester at any stage during the preparation of the polyester while the latter is in a chemical reactor maintained at a temperature of at least 140° C. and of at most 240° C., especially of at most 200° C. More preferably the organophosphorous compound and any tertiary amine and/or quaternary ammonium salt present in the resin composition is added to the polyester while the latter is in a chemical reactor maintained at a temperature of at least 140° C. and of at most 240° C., especially of at most 200° C. and at a point in time wherein the polyester has reached all its targeted and desired physical parameters such as $M_n$, acid value, hydroxyl value, functionality and $T_g$ according to the invention. This offers a greater control over the process of preparing the resin composition. Once prepared and while still in the reactor at temperatures in the range of 140 to 240° C., the polyester is in a liquid state.

By "reactor" or "chemical reactor" is meant herein a vessel designed to contain chemical reactions. Typical examples of a chemical reactor are a tank, a pipe or tubular reactor. For clarity the reaction vessel is not a substrate.

The Polyester of the Resin Composition

The resin composition apart from an organophosphorous compound comprises at least a branched amorphous carboxylic acid functional polyester, referred to herein as the "polyester".

The polyester may for example be based on a condensation reaction between alcohol functional monomers (polyol constituent of the polyester) and carboxylic acid functional monomers (polyacid constituent of the polyester).

The polyester may be prepared according to conventional condensation polymerization procedures by esterification or transesterification, optionally in the presence of customary esterification catalysts for example dibutyltin oxide or tetrabutyl titanate. The preparation conditions and the —COOH/—OH ratio may be selected so as to obtain polyesters that have an acid number and/or a hydroxyl number within the targeted range of values. Preferably the polyester is prepared in bulk without the use of a solvent. The condensation polymerization reaction may be occurred at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reactor. The condensation polymerization reaction is preferably carried out in a nitrogen atmosphere. Preferably the reactions is carried out under reduced pressure to remove water produced during the condensation polymerization reaction. A dry polyester can be isolated in any known way including direct discharge from a reactor, from a temperature as high as for example 140° C. to ambient temperature for example 23° C., any known way of spray drying, freeze drying, flashing or through devolatization during the condensation polymerization reaction or combinations thereof.

The polyester may be obtained in two-steps comprising mixing and reacting the polyacid constituent with excess of the polyalcohol constituent to form a hydroxyl functional polyester at the end of the first step; next, the hydroxyl functional polyester is reacted further with excess of carboxylic functional monomers to obtain the polyester of the invention that is a branched amorphous carboxylic acid functional polyester.

The polyester comprises at least:
bi) 1 to 45% mol of 2,2-dimethyl-1,3-propanediol;
bii) a $C_3$ to $C_5$ aliphatic diol AD1 not including 2,2-dimethyl-1,3-propanediol;
biii) a $C_6$ to $C_{50}$ aliphatic or cycloaliphatic diol AD2;
biv) 0.1 to 10% mol of an at least trifunctional monomer;
bv) 1 to 55% mol of terephthalic acid;
wherein the % mol is based on the polyester.

For clarity, the total amount of monomers from which the polyester is prepared adds up to 100% mol. Preferably, the sum of the amount of the at least trifunctional monomer, terephthalic acid, 2,2-dimethyl-1,3-propanediol (commonly known as neopentyl glycol or NPG) and the aliphatic diol different than neopentyl glycol is at least 80% mol, preferably more than 85% mol, even more preferably at least 90% mol, most preferably at least 92% mol, for example at least 95 mol %, for example 97% mol, for example 98% mol, for example 100% mol based on the polyester.

Preferably the polyester comprises at least:
bi) 1 to 45% mol of 2,2-dimethyl-1,3-propanediol;
bii) 2 to 21% mol of a $C_3$ to $C_5$ aliphatic diol AD1 not including 2,2-dimethyl-1,3-propanediol;
biii) 1 to 10% mol of a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

The polyester of the invention has an acid value of from 14 to 120 mg KOH/g polyester. Preferably, the polyester has an acid value of at least 14, more preferably of at least 18, even more preferably of at least 20, most preferably of at least 25, for example of at least 26, for example of at least 28 mg KOH/g polyester. Preferably, the polyester as an acid value of at most 120, more preferably of at most 90, even more preferably of at most 80, most preferably of at most 75, for example of at most 72, for example of at most 69, for example of at most 65, for example of at most 60 mg KOH/g polyester.

The polyester of the invention has a functionality of at least 2.02, more preferably of at least 2.05, even more preferably of at least 2.10, most preferably of at least 2.15, for example of at least 2.20. The polyester of the invention has a functionality of at most of at most 10, preferably a functionality of at most 8, more preferably a functionality of at most 7, most preferably a functionality of at most 6, for example a functionality of at most 5, for example of at most 4.5, for example of at most 4.0, for example of at most 3.5, for example of at most 3.0, for example of at most 2.9, for example of at most 2.85, for example of at most 2.80, for example of at most 2.75, for example of at most 2.7, for example of at most 2.65.

In the context of the context of the present invention, with functionality (f) of the polyester is meant the mean amount of carboxylic acid functional groups capable of reacting with for example oxirane or β-hydroxyalkylamide groups per molecule of the polyester. The functionality f for the polyester having a certain $M_n$ (theoretical value) and acid value (AV), is calculated according to the following equation:

$$f=(M_n \times AV)/56110$$

The number average molecular weight ($M_n$) is defined as follows:

$$M_n=(\Sigma_i N_i M_i)/(\Sigma_i N i)$$

where $N_i$ is the number of molecules of molecular weight $M_i$.

The $M_n$ is calculated (theoretical value) using by multiplying the targeted functionality (f) with 56110 and dividing the outcome thereof by the targeted acid value (AV) (mg KOH/g of the polyester) according to the following equation:

$$M_n=(56110 \times f)/AV$$

The number average molecular weight ($M_n$) (theoretical value) of the polyester may be for example in the range from 1000 to 20000 g/mol. Preferably the $M_n$ of the polyester is at least 1200, more preferably is at least 1400, even more preferably is at least 1700, most preferably is at least 2000, for example is at least 2200, for example is at least 2400, for example is at least 2500. Preferably the $M_n$ of the polyester is at most 10000, more preferably is at most 9000, even more preferably is at most 8000, most preferably is at most 7500, for example is at most 7000, for example is at most 6800, for example is at most 6500 g/mol.

The polyester is solid at 23° C. and at atmospheric pressure. Preferably the polyester is dry. Even more preferably the polyester is dry and solid at 23° C. and at atmospheric pressure (=1 atm). The glass transition temperature ($T_g$) of the polyester is preferably at least 40, more preferably at least 42, even more preferably at least 45, most preferably at least 48, for example at least 50° C. The glass transition temperature ($T_g$) of the polyester is preferably at most 100, more preferably at most 90 even more preferably at most 80, most preferably at most 75, for example at most 70° C., for example at most 68° C. More preferably the glass transition temperature ($T_g$) of the polyester ranges of from 40 to 70° C. because this range results in an optimum combination of storage stability and processability of the thermosetting powder coating composition.

The polyester of the present invention is amorphous. By "amorphous" is meant herein that the polyester has a glass transition temperature ($T_g$), has no sharply defined melting temperature ($T_m$) during a Differential Scanning calorimetry (DSC) measurement at a heating rate of 5° C./min from the second heating curve as explained herein after and its enthalpy of fusion $\Delta H_f$ ranges of from 0 to 40 J/g as measured via DSC at a scan rate of 5° C./min from the second heating curve as explained herein after. Preferably the $\Delta H_f$ of the polyester ranges of from 0 to 30 J/g, more preferably of from 0 to 20 J/g, even more preferably of from 0 to 10 J/g, for example is 0 J/g. Typically an amorphous polyester or amorphous resin composition is characterized by a high degree of transparency (clarity).

Glass transition temperature ($T_g$) and melting temperature ($T_m$) are determined in the context of the present invention using differential scanning calorimetry (DSC) on a Mettler Toledo, TA DSC821 by heating a sample of 10 mg from 20° C. to 150° C. at a heating rate of 40° C./minutes, keeping the sample at 150° C. for 15 minutes and subsequently cooling the sample down to 0° C. at a cooling rate of 40° C./min, keeping the sample at 0° C. for 30 seconds and reheating the sample to 200° C. at a heating rate of 5° C./min and recording the heat flow. The melting temperature and the $\Delta H_f$ of the polyester is recorded through the melting peak from the thermogram of the second heating. The glass transition temperature is determined from the step transition signal in the thermogram of the second heating as the temperature at which half height of the step transition occurs.

The polyester preferably has a viscosity at 160° C. of at most 150, more preferably of at most 125, most preferably of at most 100, for example of at most 80, for example of at most 75, for example of at most 70, for example of at most 65, for example of at most 60, for example of at most 55 Pa·s. Preferably, the polyester has a viscosity at 160° C. of at least 5, more preferably of at least 8, even more preferably of at least 12, most preferably of at least 15, for example of at least 17 Pa·s. The viscosity of the polyester is measured at 160° C. using as a cone and plate rheometer the Brookfield CAP 2000+, with spindle CAP-S-05 at 21 rpm (shear rate 70 $s^{-1}$). Once prepared and while still in the reactor at temperatures in the range of 130 to 240° C., the polyester is in a liquid state. The polyester solidifies as soon as it is brought to a temperature below its glass transition temperature for example when the polyester is discharged from a reactor onto a cooling belt which is kept at room temperature or lower temperatures.

As is apparent to the skilled person, besides the polyester, also other resins may also be present in the resin composition of the invention. It is advantageous that the resin composition of the invention apart from the organophosphorous compound substantially comprises only the polyester of the invention, since this provides for technical simplicity, is less laborious and economically more attractive.

Preferably, the amount of the polyester in the resin composition is at least 90% w/w, preferably at least 93% w/w, more preferably at least 95% w/w, even more preferably at least 97% w/w, in particular at least 98% w/w, more particularly at least 99% w/w and most preferably 100% w/w based on total amount of resins present in the resin composition.

With an at least trifunctional monomer is meant that the monomer has at least three functional groups. For example, the at least trifunctional monomer may be chosen from the group of an at least trifunctional carboxylic acid, an at least trifunctional alcohol, an at least trifunctional hydroxycarboxylic acid and mixtures thereof. Depending on the chemical nature of the functional groups of the at least trifunctional monomer, said trifunctional monomer forms part of either the polyalcohol constituent of the polyester or of the polyacid acid constituent of the polyester. If for example the at least trifunctional alcohol is a triol (trifunctional alcohol), then the triol forms part of the polyalcohol constituent of the polyester. If for example the at least trifunctional monomer is a trifunctional carboxylic acid, then the trifunctional carboxylic acid forms part of the polyacid acid constituent of the polyester.

An at least trifunctional carboxylic acid is a monomer having at least three functional 'carboxylic acid' groups. A carboxylic acid anhydride group should be counted as two 'carboxylic acid' groups. The sum of carboxylic acid groups should be at least three; for example a monomer having an anhydride group and a carboxylic acid group is, in the context of the present invention, a trifunctional carboxylic acid.

Examples of at least trifunctional carboxylic acids include but are not limited to trimellitic acid, trimellitic acid anhydride and pyromellitic acid. Preferably, if an at least trifunctional carboxylic acid or anhydride is used in the preparation of the polyester, trimellitic acid or trimellitic anhydride is used. If the polyester has an acid value above 45 mg KOH/g polyester, trimellitic acid and/or trimellitic anhydride are particularly preferred.

An at least trifunctional hydroxycarboxylic acid is a monomer having both carboxylic acid (anhydride) and alcohol functional groups. The sum of 'carboxylic acid' and alcohol groups should be at least three. Also here, a carboxylic acid anhydride group is counted as two 'carboxylic acid' groups. An example of an at least trifunctional hydroxycarboxylic acid is dimethylolpropionic acid (DMPA).

An at least trifunctional alcohol is a monomer having at least three alcohol groups. An at least trifunctional alcohol may be used in the preparation of the polyester. Examples of at least trifunctional alcohols include glycerol, hexanetriol, trimethylol ethane, trimethylol propane, pentaerythritol and sorbitol. Preferably, if an at least trifunctional alcohol is used in the preparation of the polyester, trimethylolpropane is used.

The at least trifunctional monomer is chosen from the group of an at least trifunctional carboxylic acid, an at least trifunctional alcohol, an at least trifunctional hydroxy carboxylic acid and mixtures thereof. Preferably the at least trifunctional monomer is a trifunctional alcohol or a trifunctional carboxylic acid.

The at least trifunctional monomer is in an amount ranging from 0.05% mol to 10% mol based on the polyester. Preferably the at least trifunctional monomer is in an amount of at least 0.05%, more preferably of at least 0.1% mol, even more preferably of at least 0.2% mol, most preferably of at least 0.3% mol, for example of at least 0.4% mol, for example of at least 0.5% mol based on the polyester. Preferably the at least trifunctional monomer is in an amount of at most 10% mol, more preferably of at most 8% mol, even more preferably of at most 7% mol, most preferably of at most 6% mol, for example of at most 5% mol, for example of at most 4% mol, for example of at most 3% mol, for example of at most 2% mol based on the polyester. The amount and choice of the at least trifunctional monomer determines the functionality of the polyester.

Terephthalic acid forms part of the polyacid acid constituent of the polyester. The amount of terephthalic acid is preferably from 1% mol to 55% mol based on the polyester. For instance, the amount of terephthalic acid is preferably at least 10% mol, more preferably is at least 15% mol, even more preferably is at least 20% mol, most preferably is at least 22% mol, for example is at least 24% mol, for example is at least 26% mol, for example is at least 28% mol, for example is at least 30% mol for example is at least 32% mol based on the polyester. For instance, the amount of terephthalic acid is at most 55% mol, is preferably at most 53% mol, more preferably is at most 52% mol, even more preferably is at most 51% mol, most preferably is at most 50% mol, for example is at most 48% mol, for example is at most 47% mol, for example is at most 46% mol, for example is at most 45% mol based on the polyester. The presence of terephthalic acid will increase the reverse impact resistance of the powder coating resulting from a thermosetting powder coating composition comprising the polyester of the resin composition of the invention when compared to a polyester which does not comprise terephthalic acid.

Preferably the polyacid acid constituent of the polyester comprises terephthalic acid and adipic acid (AA). In this case, preferably the polyester comprises at least:
  bi) 1 to 45% mol of 2,2-dimethyl-1,3-propanediol;
  bii) a $C_3$ to $C_5$ aliphatic diol AD1 not including 2,2-dimethyl-1,3-propanediol;
  biii) a $C_6$ to $C_{50}$ aliphatic or cycloaliphatic diol AD2;
  biv) 0.1 to 10% mol of an at least trifunctional monomer;
  bv) 1 to 55% mol of terephthalic acid;
  bvi) 0 to 15% mol of adipic acid;
  wherein the % mol is based on the polyester.

The amount of adipic acid is preferably from 0 to 15% mol based on the polyester. For instance, the amount of adipic acid is preferably at least 1% mol, more preferably is at least 1.5% mol, even more preferably is at least 2% mol, most preferably is at least 2.5% mol, for example is at least 3% mol based on the polyester. For instance, the amount of adipic acid is at most 15% mol, is preferably at most 12% mol, more preferably is at most 10% mol, even more preferably is at most 8% mol, most preferably is at most 7% mol, for example is at most 6.5% mol based on the polyester.

More preferably the polyacid acid constituent of the polyester comprises terephthalic acid, adipic acid (AA) and isophthalic acid (IPA). In this case, preferably the polyester comprises at least:

bi) 1 to 45% mol of 2,2-dimethyl-1,3-propanediol;
bii) a $C_3$ to $C_5$ aliphatic diol AD1 not including 2,2-dimethyl-1,3-propanediol;
biii) a $C_6$ to $C_{50}$ aliphatic or cycloaliphatic diol AD2;
biv) 0.1 to 10% mol of an at least trifunctional monomer;
bv) 1 to 55% mol of terephthalic acid;
bvii) 0 to 15% mol of adipic acid;
bviii) 0 to 45% mol of isophthalic acid;
wherein the % mol is based on the polyester.

The amount of isophthalic acid is preferably from 0 to 45% mol % based on the polyester. For instance, the amount of isophthalic acid is preferably at least 1% mol, more preferably is at least 2% mol, even more preferably is at least 2.2% mol, most preferably is at least 2.5% mol based on the polyester. For instance, the amount of isophthalic acid is preferably at most 45% mol, is more preferably at most 40% mol, even more preferably is at most 35% mol, most preferably is at most 30% mol, for example is at most 25% mol, for example is at most 20% mol, for example is at most 15% mol based on the polyester.

The polyacid acid constituent of the polyester may also comprise another carboxylic acid functional monomer different from terephthalic acid, or isophthalic acid or adipic acid such as for example dicarboxylic acids having preferably from 3 to 40 carbon atoms, more preferably dicarboxylic acids selected from aromatic dicarboxylic acids preferably having 8 to 14 carbon atoms, aliphatic dicarboxylic acids preferably having 4 to 12 carbon atoms and/or cycloaliphatic dicarboxylic acids preferably having 8 to 12 carbon atoms. The dicarboxylic acids may be branched, non-linear or linear. Examples of carboxylic acid functional monomers suitable for use in the polyester include for example 2,6-naphthalene dicarboxylic acid, 4,4'-oxybisbenzoic acid, tetrahydro phthalic acid, trimellitic acid, pyromellitic acid, hexahydro terephthalic acid (cyclohexane dicarboxylic acid), phthalic acid, azelaic acid, sebacic acid, decane dicarboxylic acid, succinic acid, maleic acid, phthalic acid, 1,4-cyclohexanedicarboxylic acid, cyclohexanediacetic acid, diphenyl-4,4'-dicarboxylic acid, phenylene di(oxyacetic acid), glutaric acid and fumaric acid and mixtures thereof. These carboxylic acid functional monomers may be used as such, or, in so far as available as their anhydrides, acid chlorides or lower alkyl esters. Preferably, the carboxylic acid functional monomers different than terephthalic acid, or isophthalic acid or adipic acid. are carboxylic acids.

Preferably the polyacid constituent of the polyester comprises terephthalic acid and/or adipic acid and/or isophthalic acid and/or combinations thereof.

Also monocarboxylic aromatic acids such as for example benzoic acid, tert.-butyl benzoic acid or hexahydrobenzoic acid may be used in the preparation of the polyester.

The amount of 2,2-dimethyl-1,3-propanediol (neopentyl glycol, NPG) used for the preparation of the polyester generally ranges from 1% mol to 45% mol based on the polyester. Preferably the amount of NPG is at least 5% mol, more preferably is at least 8% mol even more preferably is at least 10% mol, most preferably is at least 15% mol, for example is at least 16% mol, for example is at least 18% mol based on the polyester. Preferably the amount of NPG is at most 45% mol, more preferably at most 43% mol even more preferably at most 40% mol, most preferably at most 38% mol, for example at most 35% mol based on the polyester.

AD1 is an aliphatic $C_3$ to $C_5$ diol not including 2,2-dimethyl-1,3-propanediol (neopentyl glycol). For clarity AD1 is not neopentyl glycol. For clarity by "$C_3$ to $C_5$" is meant herein "three carbon atoms to five carbon atoms". For clarity AD1 may also have at least one ether bond (—C—O—C—) in its chemical structure. Preferably AD1 is a saturated aliphatic diol. More preferably AD1 is a saturated aliphatic diol having only hydrogen carbon bonds, carbon carbon single bonds, carbon oxygen carbon single bonds and two hydroxyl groups each of them attached to a carbon atom. Even more preferably AD1 is a saturated aliphatic diol having only hydrogen carbon bonds, carbon carbon single bonds and two hydroxyl groups each of them attached to a carbon atom. The amount of AD1 preferably ranges from 2 to 21% mol based on the polyester. Preferably the amount of AD1 is at least 2% mol, more preferably at least 3% mol even more preferably at least 4% mol, most preferably at least 4.5% mol, for example at least 5% mol based on the polyester. Preferably the amount of AD1 is at most 20% mol, more preferably at most 19% mol, even more preferably at most 18% mol, most preferably at most 17% mol, for example at most 16% mol, for example at most 15% mol based on the polyester.

Examples of AD1 aliphatic $C_3$ to $C_5$ diols include but are not limited to, diethylene glycol, 1,3-propanediol, 1,2-propanediol, 1,4-butanediol, 1,3-butanediol, 1,2-butanediol. Preferably AD1 is 1,2-propane diol.

One of the advantages of using an AD1 aliphatic $C_3$ to $C_5$ diol may be that it contributes to improving the storage stability of a thermosetting powder coating composition.

AD2 is an aliphatic or a cycloaliphatic $C_6$ to $C_{50}$ diol. For clarity by "$C_6$ to $C_{50}$" is meant herein "six carbon atoms to fifty carbon atoms". Preferably AD2 is an at least $C_6$ aliphatic or cycloaliphatic diol, more preferably AD2 is an at most $C_{40}$ aliphatic or cycloaliphatic diol, even more preferably AD2 is an at most $C_{30}$ aliphatic or cycloaliphatic diol, most preferably AD2 is an at most $C_{25}$ aliphatic or cycloaliphatic diol, especially AD2 is an at most $C_{22}$ aliphatic or cycloaliphatic diol, more especially AD2 is an at most $C_{20}$ aliphatic or cycloaliphatic diol, even more especially AD2 is an at most $C_{18}$ aliphatic or a cycloaliphatic diol, most especially AD2 is an at least $C_{16}$ aliphatic or a cycloaliphatic diol, for example AD2 is an at most $C_{14}$ aliphatic or a cycloaliphatic diol, for example AD2 is an at most $C_{12}$ aliphatic or a cycloaliphatic diol, for example AD2 is an at most $C_{10}$ aliphatic or a cycloaliphatic diol. For clarity AD2 may also encompass at least one ether bond (—C—O—C—) in its chemical structure. Preferably AD2 is a saturated aliphatic or saturated cycloaliphatic diol. More preferably AD2 is a saturated aliphatic or saturated cycloaliphatic diol. Even more preferably AD2 is a saturated aliphatic or saturated cycloaliphatic diol having only hydrogen carbon bonds, carbon carbon single bonds, carbon oxygen carbon single bonds and two hydroxyl groups each of them attached to a carbon atom. Most preferably AD2 is a saturated aliphatic or saturated cycloaliphatic diol having only hydrogen carbon bonds, carbon carbon single bonds and two hydroxyl groups each of them attached to a carbon atom.

The amount of AD2 preferably ranges from 1 to 10% mol based on the polyester. Preferably the amount of AD2 is at least 1% mol, more preferably at least 1.5% mol even more preferably at least 2% mol, most preferably at least 2.5% mol, for example at least 3% mol based on the polyester. Preferably the amount of AD2 is at most 10% mol, more preferably at most 9.5% mol, even more preferably at most 9% mol, most preferably at most 8.5% mol, for example at most 8% mol, for example at most 7.5% mol, for example at most 7% mol based on the polyester. Examples of AD2 aliphatic $C_6$ to $C_{50}$ diols include but are not limited to 1,6-hexane diol, 1,7-heptanol, dipropylene glycol, 2,2-bis-(4-hydroxy-cyclohexyl)-propane (hydrogenated bisphenol- A), 1,4-dimethylolcyclohexane, hydroxy pivalic ester of neopentyl glycol, 2,2-bis[4-(2-hydroxy ethoxy)-phenyl]propane, 2-ethyl, 2-butyl propanediol-1,3 (=butylethylpropane diol), 2-ethyl, 2-methyl propanediol-1,3 (=ethylmethylpropane diol). Preferably AD2 is 1,6-hexanediol.

One of the advantages of using an AD2 aliphatic or a cycloaliphatic $C_6$ to $C_{50}$ diol and in particular of $C_6$ to $C_{20}$ diol may be that it contributes to improving the smoothness and/or the reverse impact resistance of a powder coating.

Preferably the polyester comprises 3 to 21% mol of AD1 and 2 to 10% mol of AD2 based on the polyester.

Preferably, the molar ratio of AD1 to AD2 (=mol AD1/mol AD2) in the polyester is at least equal or higher to 1 and at most equal to 10.

Preferably, AD1 is 1,2-propane diol and AD2 is 1,6-hexane diol.

Preferably the resin composition of the invention comprises at least:
a. an organophosphorous compound; and
b. a branched amorphous carboxylic acid functional polyester, said polyester having a Tg of at least 40° C. as measured by Differential Scanning calorimetry at a heating rate of 5° C./min, said polyester comprising polycondensed residues derived from at least the following monomers:
bi) 1 to 45% mol of 2,2-dimethyl-1,3-propanediol;
bii) 2 to 21% mol of a $C_3$ to $C_5$ aliphatic diol AD1 not including 2,2-dimethyl-1,3-propanediol;
biii) 1 to 10% mol of a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

Preferably the resin composition of the invention comprises at least:
a. an organophosphorous compound; and
b. a branched amorphous carboxylic acid functional polyester, said polyester having a $T_g$ of at least 40° C. as measured by Differential Scanning calorimetry at a heating rate of 5° C./min, said polyester comprising polycondensed residues derived from at least the following monomers:
bi) 10 to 45% mol of 2,2-dimethyl-1,3-propanediol;
bii) a $C_3$ to $C_5$ aliphatic diol AD1 not including 2,2-dimethyl-1,3-propanediol;
biii) a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

Preferably the resin composition of the invention comprises at least:
a. an organophosphorous compound; and
b. a branched amorphous carboxylic acid functional polyester, said polyester having a $T_g$ of at least 40° C. as measured by Differential Scanning calorimetry at a heating rate of 5° C./min, said polyester comprising polycondensed residues derived from at least the following monomers:
bi) 18 to 35% mol of 2,2-dimethyl-1,3-propanediol;
bii) a $C_3$ to $C_5$ aliphatic diol AD1 not including 2,2-dimethyl-1,3-propanediol;
biii) a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

Preferably the resin composition of the comprises at least:
a. an organophosphorous compound; and
c. a branched amorphous carboxylic acid functional polyester, said polyester having a $T_g$ of at least 40° C. as measured by Differential Scanning calorimetry at a heating rate of 5° C./min, said polyester comprising polycondensed residues derived from at least the following monomers:
bi) 18 to 35% mol of 2,2-dimethyl-1,3-propanediol;
bii) 3 to 21% mol of a $C_3$ to $C_5$ aliphatic diol AD1 not including 2,2-dimethyl-1,3-propanediol;
biii) 2 to 10% mol of a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

Preferably the resin composition of the invention comprises at least:
a. an organophosphorous compound; and
d. a branched amorphous carboxylic acid functional polyester, said polyester having a $T_g$ of at least 40° C. as measured by Differential Scanning calorimetry at a heating rate of 5° C./min, said polyester comprising polycondensed residues derived from at least the following monomers:
bi) 18 to 35% mol of 2,2-dimethyl-1,3-propanediol;
bii) 3 to 21% mol of a $C_3$ to $C_5$ aliphatic diol AD1 not including 2,2-dimethyl-1,3-propanediol;
biii) 2 to 10% mol of a $C_6$ to $C_{50}$ aliphatic or cycloaliphatic diol AD2;
biv) 0.1 to 10% mol of an at least trifunctional monomer;
bv) 10 to 55% mol of terephthalic acid;
the molar ratio of AD1 to AD2 (=mol AD1/mol AD2) in the polyester is at least equal or higher to 1 and at most equal to 10, wherein the % mol is based on the polyester.

Preferably, the resin composition of the invention which is solid at 23° C. and at atmospheric pressure comprises at least:
a. an organophosphorous compound; and
e. a branched amorphous carboxylic acid functional polyester, said polyester having a theoretical $M_n$ of at least 1500 g/mol and of at most 8000 g/mol, an acid value of at least 25 and of at most 90 mg KOH/g polyester, a hydroxyl value of at most 8 mg KOH/g polyester, a functionality of at least 2.1 and of at most 4, a $T_g$ of at least 40° C. and of at most 90° C. as measured by Differential Scanning calorimetry at a heating rate of 5° C./min, said polyester comprising polycondensed residues derived from at least the following monomers:
bi) 18 to 35% mol of 2,2-dimethyl-1,3-propanediol;
bii) 3 to 21 of a $C_3$ to $C_5$ aliphatic diol AD1 not including 2,2-dimethyl-1,3-propanediol;
biii) 2 to 10 of a $C_6$ to $C_{50}$ aliphatic or cycloaliphatic diol AD2;
biv) 0.1 to 10% mol of an at least trifunctional monomer;
bv) 10 to 55% mol of terephthalic acid;
wherein the % mol is based on the polyester.

Preferably the resin composition of the invention comprises at least:
a. an organophosphorous compound; and
f. a branched amorphous carboxylic acid functional polyester, said polyester having a $T_g$ of at least 40° C. as measured by Differential Scanning calorimetry at a heating rate of 5° C./min, said polyester comprising polycondensed residues derived from at least the following monomers:
bi) 18 to 35% mol of 2,2-dimethyl-1,3-propanediol;
bii) 3 to 21% mol of 1,2-propane diol;
biii) 2 to 10% mol of 1,6-hexane diol;

biv) 0.1 to 10% mol of an at least trifunctional monomer;
bv) 10 to 55% mol of terephthalic acid;
the molar ratio of 1,2-propane diol to 1,6-hexane diol (=mol 1,2-propane diol/mol 1,6-hexane diol) in the polyester is at least equal or higher to 1 and at most equal to 10,
wherein the % mol is based on the polyester.

Other suitable diol that may be used to prepare the polyester is for example ethylene glycol.

Any feature or preferred combination of features or preferred combination of ranges disclosed in the present invention and regard the organophosphorous compound, the amine, the amine salt and the polyester of the resin composition of the invention can be combined.

In another aspect, the present invention provides for a process for the preparation of a resin composition according to the invention, said resin composition is solid at 23° C. and at atmospheric pressure, comprising at least the steps of:
  a. preparing a polyester according to the invention in a chemical reactor;
  b. adding at least an organophosphorous compound as defined herein at any stage during the preparation of the polyester at a temperature between 140 and 240° C. and while the polyester is still in the chemical reactor, to obtain a mixture of the organophosphorous compound and the already prepared polyester;
  c. solidifying the mixture obtained in step b) to obtain a resin composition according to the invention.

In another embodiment, the present invention provides for a process for the preparation of a resin composition according to the invention, said resin composition is solid at 23° C. and at atmospheric pressure, comprising at least the steps of:
  a. preparing a polyester according to the invention in a chemical reactor;
  b. adding at least an organophosphorous compound and any amine and/or amine salt as defined herein, at any stage during the preparation of the polyester at a temperature between 140 and 240° C. and while the polyester is still in the chemical reactor, to obtain a mixture of the organophosphorous compound and any amine and/or amine salt and the already prepared polyester;
  c. solidifying the mixture obtained in step b) to obtain a resin composition according to the invention.

In another embodiment, the present invention provides for a process for the preparation of a resin composition according to the invention, said resin composition is solid at 23° C. and at atmospheric pressure, comprising at least the steps of:
  a. preparing a polyester according to the invention in a chemical reactor;
  b. adding at least an organophosphorous compound as defined herein to the already prepared polyester at a temperature between 140 and 240° C. and while the polyester is still in the chemical reactor, to obtain a mixture of the organophosphorous compound and the already prepared polyester;
  c. solidifying the mixture obtained in step b) to obtain a resin composition according to the invention.

In another embodiment, the present invention provides for a process for the preparation of a resin composition according to the invention, said resin composition is solid at 23° C. and at atmospheric pressure, comprising at least the steps of:
  a. preparing a polyester according to the invention in a chemical reactor;
  b. adding at least an organophosphorous compound and any amine and/or amine salt as defined herein to the already prepared polyester at a temperature between 140 and 240° C. and while the polyester is still in the chemical reactor, to obtain a mixture of the organophosphorous compound and any amine and/or amine salt and the already prepared polyester;
  c. solidifying the mixture obtained in step b) to obtain a resin composition according to the invention.

The Thermosetting Powder Coating Composition

The thermosetting powder coating composition of the invention comprises the resin composition of the invention and at least a crosslinker having functional groups that are reactive with the carboxylic acid groups of the polyester.

The thermosetting powder coating composition of the invention comprises the polyester in an amount of from 50 to 98% w/w based on the total weight of the polyester and the crosslinker, and a crosslinker having functional groups that are reactive with the carboxylic acid groups of the polyester in an amount of from 2 to 50% w/w based on the total weight of the polyester and the crosslinker.

The crosslinker in the thermosetting powder coating composition of the present invention may be a compound having at least two β-hydroxyalkylamide (BHA) groups or a compound having at least two oxirane rings. In the context of the invention, compounds having at least two oxirane rings will be referred to as "epoxy compounds" and compounds having at least two 3-hydroxyalkylamide (BHA) groups will be referred to as "BHA compounds". Preferably the crosslinker in the thermosetting powder coating composition of the invention is an epoxy compound.

Suitable examples of commercially available BHA compounds are for example N,N,N',N'-tetrakis-(2-hydroxyethyl)-adipamide (Primid® XL-552) and N,N,N',N'-tetrakis-(2-hydroxypropyl)-adipamide (Primid® QM 1260) available from EMS Chemie AG.

If the crosslinker is a BHA compound, the amount of the polyester in the thermosetting powder coating composition preferably ranges from 85 to 98% w/w, more preferably ranges from 90 to 98% w/w, even more preferably ranges from 93 to 97% w/w based on the total amount of the polyester and the crosslinker.

Preferably the crosslinker in the thermosetting powder coating composition of the invention is an epoxy compound. More preferably the crosslinker in the thermosetting powder coating composition of the invention is only an epoxy compound.

Examples of epoxy compounds (also known as epoxy resins or epoxy crosslinkers) include bisphenol-A resins, bisphenol-F epoxy resins, glycidylesters, triglycidylisocyanurates and combinations thereof. It is preferred to use a an epoxy compound chosen from the group consisting of bisphenol-A resins, bisphenol-F epoxy resins, glycidylesters and combinations thereof. More preferably, the epoxy compound is chosen from the group consisting of bisphenol-A resins, glycidylesters and combinations thereof. Most preferred the epoxy compound is a bisphenol-A epoxy resin.

Suitable examples of commercially available bisphenol-A epoxy resins include Araldite® GT-7004 (Huntsman), Epikote® 1002 (Shell) and DER 662®, DER 663® and DER 664® (Dow).

Suitable examples of commercially available glycidylesters include Araldite® PT910 and Araldite® PT912. Examples of triglycidylisocyanurates include TGIC, which is commercially available as Araldite® PT810. The epoxy compounds can vary considerably in molecular weight.

This is most often expressed as the epoxy equivalent weight (EEW). The epoxy equivalent weight is the weight of an epoxy compound containing exactly one mole of epoxy groups, expressed in g/mol. Preferably the EEW ranges from 100 to 1500, more preferably from 150 to 1200, even more preferably from 200 to 900 and most preferably from 400 to 850 g/mol.

If the crosslinker is an epoxy compound the amount of the polyester in the thermosetting powder coating composition preferably ranges from 50 to 98% w/w, more preferably ranges from 50 to 90% w/w, even more preferably ranges from 50 to 85% w/w, most preferably ranges from 50 to 80% w/w, for example ranges from 50 to 75% w/w, for example ranges from 60 to 75% w/w, for example ranges from 65 to 75% w/w, for example ranges from 67 to 75% w/w based on the total amount of the polyester and the crosslinker.

Thermosetting powder coating compositions wherein the crosslinker is an epoxy compound and the amount of the polyester ranges from 67 to 75% w/w based on the total amount of the polyester and the crosslinker are particularly preferred.

The glass transition temperature ($T_g$) of the uncured thermosetting powder coating composition is preferably at least 20° C., more preferably at least 25° C., even more preferably at least 35° C., most preferably at least 45° C. The glass transition temperature ($T_g$) of the uncured thermosetting powder coating composition is preferably at most 100° C., more preferably at most 90° C., even more preferably at most 80° C., most preferably at most 70° C. In case in which the thermosetting powder compositions have a $T_g$ as well as a $T_m$, the $T_m$ is preferably at least 30° C., more preferably at least 40° C., even more preferably at least 45° C., most preferably at least 50° C. The $T_m$ of the uncured thermosetting powder coating composition is preferably at most 160° C., more preferably at most 140° C., even more preferably at most 120° C., most preferably at most 100° C. Glass transition temperature ($T_g$) and/or the $T_m$ of the uncured thermosetting powder coating composition is measured via temperature modulated DSC (MDSC). The measurement of $T_g$ and/or $T_m$ is performed by using a TA Instruments Q 2000 MDSC with a RCS2-90 cooling unit. Measurements are done in $N_2$ atmosphere and the MDSC apparatus is calibrated with indium, zinc and water. The software used for operating the MDSC and analyzing the thermograms is the Q-Series Advantage version 2.8.0394 from TA Instruments. A sample of approximately 10 mg sealed in aluminum DSC pans is heated up from 0° C. up to 200° C. at a heating rate of 5° C./min and an amplitude of temperature modulation of ±0.5° C. with a period of 40 s. The $T_g$ signal seen in the reversible heat flow is determined by using the analysis software.

As is apparent to the skilled person, besides the polyester, also other resins may be present in the thermosetting powder coating composition of the invention. Preferably, the amount of the polyester in the thermosetting powder coating composition is at least 90% w/w, preferably at least 93% w/w, more preferably at least 95% w/w, even more preferably at least 97% w/w, in particular at least 98% w/w, more in particular at least 99% w/w and most preferably 100% w/w based on total amount of resins present in the thermosetting powder coating composition. Preferably, the thermosetting powder coating composition of the invention comprises only the polyester of the invention because this offers technical simplicity.

It is advantageous to use only the polyester of the invention in the thermosetting powder coating composition as the use of only one resin as opposed to a mixture of resins in a thermosetting powder coating composition is less laborious and economically more attractive.

Any feature or preferred combination of features or preferred combination of ranges disclosed in the present invention and regard the resin composition of the invention and the crosslinker can be combined.

Any feature or preferred combination of features or preferred combination of ranges disclosed in the present invention and regard the resin composition and the thermosetting powder coating composition of the invention can be combined.

The thermosetting powder coating composition according to the invention may further comprise waxes, pigments, fillers and/or the usual (processing) additives, for example degassing agents, smoothness, appearance enhancing agents or (light) stabilizers. The pigments may be inorganic or organic. Suitable inorganic pigments include for example, titanium dioxide, zinc sulphide, zinc phosphate, mica, iron oxide and/or chromium oxide. Suitable organic pigments include for example azo compounds. Suitable fillers include for example metal oxides, silicates, carbonates and sulphates. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added. Some of these additives may be added after the polyester is prepared in a chemical reactor but before the polyester is discharged from the chemical reactor. Alternatively, some of these additives may be added in the premix of the thermosetting powder coating composition as described above or in the extruder for instance by liquid injection.

In another aspect, the present invention provides for a process for the preparation of a thermosetting powder coating composition according to the invention comprising at least the steps of:

a. mixing a resin composition as defined herein with a crosslinker having functional groups that are reactive with the carboxylic acid groups of the polyester of the resin composition, to obtain a premix;

b. heating the obtained premix, preferably in an extruder, to obtain an extrudate;

c. cooling down the extrudate obtained in step b) to obtain a solidified extrudate;

d. grinding the obtained solidified extrudate into smaller particles to obtain the thermosetting powder coating composition and preferably classifying the thus prepared powder particles via a sieve and collect sieve fraction with particle size below 130 μm, preferably below 90 μm.

In a preferred embodiment, the present invention provides for a process for the preparation of a thermosetting powder coating composition according to the invention comprising at least the steps of:

a. preparing a resin composition as described herein in any of the embodiments;

b. mixing the resin composition obtained in step a) with a crosslinker having functional groups that are reactive with the carboxylic acid groups of the polyester of the resin composition, to obtain a premix;

c. heating the obtained premix, preferably in an extruder, to obtain an extrudate;

d. cooling down the extrudate obtained in step c) to obtain a solidified extrudate;

e. grinding the obtained solidified extrudate into smaller particles to obtain the thermosetting powder coating composition and preferably classifying the thus prepared powder particles via a sieve and collect sieve fraction with particle size below 130 µm, preferably below 90 µm.

Preferably, the premix is heated to a temperature in the range of 80-130° C., more preferably in the range of 90-120° C. If the premix is heated in an extruder, it is preferred to use a temperature control in order to avoid too high temperatures that could lead to cure of the thermosetting powder coating composition in the extruder. Other means of controlling the temperature, especially in large extruders can be the control over the throughput, the feeding of the granulate, the screw geometry and speed.

In yet another aspect, the invention relates to a process for coating a substrate comprising the following steps:
  a) applying a thermosetting powder coating composition according to the invention to a substrate such that the substrate is partially or fully coated with a coating.
  b) heating the obtained partially or fully coated substrate for such time and to such temperature such that a coating is obtained that is at least partially cured.

The thermosetting powder coating composition of the present invention may be applied using the techniques known to the person skilled in the art, for example using electrostatic spraying or electrostatic fluidized bed.

Heating of the coated substrate may be done using conventional methods, such as with a convection oven and/or with an IR lamp or with a flame spray gun.

The time during which the coating is at least partially cured is preferably below 60 minutes and usually above 1 minute in case a convection oven is used to heat the coating. More preferably, the curing time is below 40 minutes in case a convection oven is used to heat the coating. Curing temperatures are typically within the range of 110 to 225° C. The thermosetting powder coating composition of the invention can be cured at temperatures as low as 170° C., preferably 160° C., more preferably 150° C. even more preferably 140° C. for at most 30 minutes, preferably at most 15 minutes, even more preferably at most 10 minutes. For example, the curing time and temperature of a powder coating composition according to the invention may be 5 minutes at 170° C., or 10 minutes at 160° C. or 15 minutes at 150° C. or 30 min at 140° C.

The thermosetting powder coating compositions of the invention are not only very suitable for low bake, but may also be used for fast cure. It is known that thermosetting powder coating compositions that can be cured at lower temperatures offer at the same time the possibility for cure at relatively higher temperatures but for significant shorter times, thus allowing the end-user (powder coaters) to select the optimum cure conditions at will, hence maximizing the process efficiency and the powder coating line's throughput.

In another aspect the invention relates to a process for forming a coating on a substrate comprising the steps of applying a thermosetting powder coating composition according to the invention onto the substrate and curing the composition to form the coating which in the context of the invention is referred herein to as the "powder coating". The curing of the composition is carried out at a temperature that ranges from at least 110° C. to at most 225° C. for a time period that ranges from at least 1 minute to at most 60 min. Preferably the curing of the composition is carried out at a temperature that ranges from at least 130° C. to at most 180° C. for a time period that ranges from at least 1 minute to at most 45 min, more preferably the curing of the composition is carried out at a temperature that ranges from at least 140° C. to at most 170° C. for a time period that ranges from at least 5 minute to at most 30 min.

In another aspect, the invention relates to a powder coating prepared by partial or full cure of a thermosetting powder coating composition according to the invention. The powder coating can be a primer, top coat or an intermediate coating, the latter playing for example the role of an interlayer adhesion promoter or that of a barrier coating.

In another aspect the present invention relates to a coated substrate comprising a coating derived upon curing of a thermosetting powder coating composition according to the invention.

The invention also relates to a substrate fully or partially coated with a thermosetting powder coating composition according to the invention or with a powder coating according to the invention.

The invention also relates to a substrate fully or partially coated with a thermosetting powder coating composition according to the invention or with a powder coating according to the invention wherein the substrate is selected from the group consisting of glass, ceramic, fibre cement board, or metal, for example aluminum, copper or steel.

Typical examples of substrates include glass, ceramic, fibre cement board, or metal, for example aluminum, copper or steel. Steel substrates, for instance include carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate etc.) or non-surface treated.

In yet another aspect the invention relates to an article comprising a coated substrate according to the invention and at least one more substrate to which the coated substrate is in contact or envelops said coated substrate.

In yet another aspect, the invention also relates to the use of a thermosetting powder coating composition according to the invention to fully or partially coat a substrate.

Use of a polyester according to the invention in automotive, marine, aerospace, medical, defense, sports/recreational, architectural, bottling, household and machinery applications.

Use of a resin composition according to the invention in automotive, marine, aerospace, medical, defense, sports/recreational, architectural, bottling, household and machinery applications.

Use of a thermosetting powder coating composition according to the invention in automotive, marine, aerospace, medical, defense, sports/recreational, architectural, bottling, household and machinery applications.

Use of a coated substrate according to the present invention in automotive, marine, aerospace, medical, defense, sports/recreational, architectural, bottling, household and machinery applications.

Use of an article according to the present invention in automotive, marine, aerospace, medical, defense, sports/recreational, architectural, bottling, household and machinery applications.

Use of a polyester according to the invention in a thermosetting powder coating composition according to the invention to provide upon curing of the composition a coating that that has no blooming and has a smoothness of at least PCI 2 wherein the smoothness of said coating is visually compared to the smoothness of PCI Powder Coating Smoothness panels [ACT Test Panels Inc., APR22163 (A)] at a coating thickness of approximately 60 µm.

Use of an organophosphorous compound in a thermosetting powder coating composition according to the invention to provide upon curing of said composition a coating that has no blooming and has a smoothness of at least PCI 2 wherein the smoothness of said coating is visually compared to the smoothness of PCI Powder Coating Smoothness panels [ACT Test Panels Inc., APR22163 (A)] at a coating thickness of approximately 60 µm.

Use of an organophosphorous compound and any amine and/or amine salt in a thermosetting powder coating composition according to the invention to provide upon curing of said composition a coating that has no blooming and has a smoothness of at least PCI 4 wherein the smoothness of said coating is visually compared to the smoothness of PCI Powder Coating Smoothness panels [ACT Test Panels Inc., APR22163 (A)] at a coating thickness of approximately 60 µm.

Use of a resin composition according to the invention in a thermosetting powder coating composition according to the invention to provide upon curing of the composition a coating that has no blooming and has a smoothness of at least PCI 2 wherein the smoothness of said coating is visually compared to the smoothness of PCI Powder Coating Smoothness panels [ACT Test Panels Inc., APR22163 (A)] at a coating thickness of approximately 60 µm.

Use of a resin composition according to the invention in a thermosetting powder coating composition according to the invention to provide upon curing of the composition a coating that has no blooming and has a smoothness of at least PCI 4 wherein the smoothness of said coating is visually compared to the smoothness of PCI Powder Coating Smoothness panels [ACT Test Panels Inc., APR22163 (A)] at a coating thickness of approximately 60 µm.

Use of a thermosetting powder coating composition according to the invention in automotive, marine, aerospace, medical, defense, sports/recreational, architectural, bottling, household and machinery applications.

Examples of automotive applications include but are not limited to car parts, agricultural machines, composite structures, ceramic structures.

Examples of marine applications include but are not limited to ship parts, boats parts, boats.

Examples of aerospace applications include but are not limited to planes, helicopters, composite structures, ceramic structures.

Examples of medical applications include but are not limited to artificial joints, meshes, woven or non-woven sheets, tapes, ribbons, bands, cables, tube-like products for e.g. ligament replacement, composite structures, ceramic structures.

Examples of defence applications include but are not limited to ballistic protection, body armour, ballistic vests, ballistic helmets, ballistic vehicle protection, composite structures, ceramic structures.

Examples of sports/recreational applications include but are not limited to fencing, skates, skateboarding, snowboarding, suspension lines on sport parachutes, paragliders, kites, kite lines for kite sports, climbing equipment, composite structures, ceramic structures.

Examples of architectural applications include but are not limited to windows, doors, (pseudo-)walls, cables.

Examples of household applications include but are not limited to household appliances, white goods, furniture, office furniture, domestic appliances, computer housings.

Examples of machinery applications include but are not limited to can and bottle handling machine parts, moving parts on weaving machines, bearings, gears, composite structures, ceramic structures.

Yet, another aspect of the invention is a resin composition chosen from the group of resin compositions according to the Examples 7 to 11.

Yet, another aspect of the invention is a thermosetting powder coating composition chosen from the group of thermosetting powder coating compositions according to the Examples 18 to 24.

Yet, another aspect of the invention is a powder coating chosen from the group of powder coatings according to the Examples 31 to 37.

Many other variations embodiments of the invention will be apparent to those skilled in the art and such variations are contemplated within the broad scope of the present invention.

All embodiments disclosed herein may be combined with each other and/or with preferred elements of the present invention.

Further aspects of the invention and preferred features thereof are given in the claims herein.

The invention will now be described in detail with reference to the following non limiting examples which are by way of illustration only.

EXAMPLES

In the Examples section, the abbreviation "Comp" denotes a Comparative Example of either a resin composition e.g. CompRC1, or a thermosetting powder coating composition e.g. CompPCC1, or a powder coating e.g. CompPC1.

Analytical Methods and Techniques for the Measurement of the Properties of the Polyesters of the Resin Compositions Table 1 presents the composition and properties of the polyesters used in resin compositions CompRC1-CompRC6 and RC7-RC11. The amounts of monomers used to prepare the polyesters of Table 1 are mentioned in % mol based on the polyester. The amounts of the phosphonium salt and of the tertiary amine used to prepare the resin compositions of Table 1 are mentioned in % w/w based on the total weight of the polyester and the phosphonium salt and tertiary amine.

The measurement of the glass transition temperature ($T_g$) of the polyesters was carried out via differential scanning calorimetry (DSC) on a Mettler Toledo, TA DSC821, in $N_2$ atmosphere, calibrated with indium, zinc and water. The processing of the signal (DSC thermogramme, Heat Flow vs. Temperature) was carried out via STARe Software version 9.10 provided by Mettler Toledo A.G. A sample of 10 mg was heated from room temperature up to 150° C. at a heating rate of 40° C./min. As soon as the sample reached 150° C., temperature remained constant for 15 min. Subsequently, the sample was cooled down to 0° C. at a cooling rate of 40° C./min. After the sample reached 0° C. and keeping the sample in that temperature for 30 seconds, it was subsequently heated up to 200° C. at a heating rate of 5° C./min. At the glass transition temperature, a so called step transition is seen as the baseline shifts due to changes in thermal properties of the resin. This "step" is used to determine the $T_g$ of the polyester resin. The midpoint of this step in the thermogramme is calculated using the software supplied with the Mettler Toledo DSC apparatus and is defined as the $T_g$ of the polyester. The accuracy of the method is +/−0.5° C.

Viscosity measurements were carried out at 160° C., using as a cone and plate rheometer the Brookfield CAP 2000+ Viscometer, with spindle CAP-S-05 at 21 rpm (shear rate 70 s$^{-1}$).

The acid value (AV) (mg KOH/g of polyester) and hydroxyl value (OHV) (mg KOH/g of polyester) of the polyesters were measured titrimetrically according to ISO 2114-2000 and ISO 4629-1978, respectively.

The $T_g$, the viscosity, the AV and OHV were measured on the polyester without the addition of any additives.

The functionality (f) for a polyester of a certain $M_n$ (theoretical value) and a targeted acid value (AV), was calculated according to the following equation:

$$f = (M_n \times AV)/56110$$

The $M_n$ (theoretical value) was calculated by multiplying the targeted functionality (f) with 56110 and dividing the outcome thereof by the targeted acid value (AV) (mg KOH/g of the polyester) according to the following equation:

$$M_n = (56110 \times f)/AV$$

The theoretical values of the $M_n$ and f refer to the polyester without the addition of any additives.

The targeted AV (mg KOH/g polyester) for all polyesters of Examples 1-11 was equal to 35.

Measurements and Assessment of Properties of the Thermosetting Powder Coating Compositions The storage stability of the thermosetting powder coating compositions of the present invention was tested according to ISO 8130/part 8, at 40° C. for a total of 28 days. Prior to assessing the storage stability the thermosetting powder coating composition was left to cool down to room temperature for at least 2 hours. The extent of the agglomeration was visually assessed and ranked according to the following rating on a 1-10 scale [1: very poor stability (extensive agglomeration, thermosetting powder coating composition was compacted into one solid block) and 10: excellent stability (no agglomeration, free flowing powder, powder flow same as a freshly prepared thermosetting powder coating composition)]. In the context of the present invention thermosetting powder coating compositions that are rated with at least 6, are regarded as "storage stable".

Measurements and Assessment of Properties of the Powder Coatings

All the properties of the powder coatings were assessed using well defined steel Q-panels (S-46, 0.8 mm×102 mm×152 mm) from Q-Lab Corporation. The assessment of the powder coating properties was carried out on a powder coating that was cured at 160° C. for 10 minutes under atmospheric pressure (1 atm).

Coating thickness was measured by a PosiTector 6000 coating thickness gage from DeFelsko Corporation.

The blooming was assessed visually. An AlMg3 type of panel was coated with a white thermosetting powder coating composition of the invention and the coating derived upon curing of the powder coating in a gradient oven, set from 100 to 200° C. for 30 min, was visually inspected. The blooming can be seen as a surface haze over the coating and the temperature range where blooming occurs is reported. The extent of blooming was assessed as: a) no blooming, b) limited blooming and c) extensive blooming. For the thermosetting powder coating compositions of the invention, their corresponding powder coatings presenting limited to no blooming are preferred.

Reverse impact resistance (RIR) (inch/lbs, 1 inch/lbs=0.055997 m/kg) of a powder coating obtained by curing of a thermosetting powder coating composition at a certain temperature and time, is defined as the ability of a 75 μm thick powder coating prepared from the thermosetting powder coating composition of the invention on S-46 panels of 0.8 mm thickness to withstand impact of 160 inch/lbs as measured using a ⅝" ball ("pass" according to ASTM D 2794). RIR is measured using ASTM D2794 according to the method as described herein. A "Pass" in the row for RIR indicates that the powder coating could withstand the impact (showed no cracks or delamination) when the corresponding thermosetting powder coating composition was cured for 10 minutes at 160° C. A "Fail" indicates that the coating did not withstand the impact (showed cracks or delamination) With sufficient reverse impact resistance of a powder coating is meant that the powder coatings withstand the reverse impact resistance test (as described herein) when cured for only 10 minutes at 160° C. For the thermosetting powder coating compositions of the invention, their corresponding powder coatings presenting limited to no blooming are preferred.

Full cure of a thermosetting powder coating composition (or 'thermosetting fully cured powder coating composition') is defined herein as the curing temperature and time condition at which the resulted powder coating having coating thickness of 75 μm, showed no cracks or delamination after having been subjected to reverse impact resistance was tested according to ASTM D 2794 as described above.

The gloss of the powder coatings derived upon full cure of the corresponding thermosetting powder coating compositions on S-46 panels were measured according to ASTM D523 with a BYK-Gardner GmbH Haze-Gloss meter. The gloss is reported at angles of 20° and 60° in gloss units.

Smoothness of powder coatings derived upon full cure of the corresponding thermosetting powder coating compositions was determined by comparing the smoothness of the coating with PCI Powder Coating Smoothness panels (ACT Test Panels Inc., APR22163 (A) Batch: 50708816) at a thickness of 60-75 μm. The rating of smoothness is from 1 to 10, with 1 representing the roughest coating and 10 representing the smoothest coating. For the thermosetting powder coating compositions of the invention, their corresponding powder coatings presenting smoothness equal or higher to 2, are desirable.

The degassing limit of a thermosetting powder coating composition of the present invention was measured according to ASTM D 714. The degassing limit of a thermosetting powder coating composition is measured on the powder coating prepared therefrom and is expressed in coating thickness (μm). More particularly and in the context of the present invention, it was measured according to the following experimental procedure: a S-46 panel was electrostatically coated with a thermosetting powder coating composition in such a manner that upon curing at 160° C. for 10 minutes, a gradient of thickness typically ranging from 40 to 160 μm was obtained. The resulting powder coating was visually inspected for coating defects. The degassing limit is reported as the layer thickness (μm) from which blisters, pinholes or other coating surface defects start to be visible to the naked eye. Higher values for the degassing limit are preferred to lower values.

Examples 1-11: Synthesis of the Polyesters/Preparation of the Resin Compositions The composition of the polyesters of the resin compositions CompRC1-CompRC6 and RC7-RC11 as presented in the description of the Examples and in Table 1, refer to a yield of 4 Kg of polyester. The polyesters used to prepare the resin compositions of Examples 1-11 were prepared via a two-phase (or two-step) polycondensation reaction. At the end of the first phase a hydroxyl functional polyester was obtained; next the hydroxyl functional polyester was reacted further with excess of carboxylic acid functional monomers to obtain the branched amorphous carboxylic acid functional polyesters of the Examples 1-11. All the polyesters of Examples 1-11 were solid at room temperature and at atmospheric pressure.

All resin compositions of Examples 1-11 were solid at 23° C. and at atmospheric pressure.

Example 1: Synthesis of the Polyester and Preparation of the Resin Composition CompRC1

To a reactor (6.0 L) fitted with a thermometer, a stirrer and a distillation device was added a tin-based catalyst, neopentyl glycol (1459.59 g, 14.01 mol), ethylene glycol (115.02 g, 1.85 mol) and trimethylol propane (59.49 g, 0.44 mol). The vessel was heated up to 150° C. until the mixture was molten. Then terephthalic acid (2431.32 g, 14.64 mol) and isophtalic acid (63.46 g, 0.38 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (237.98 g, 1.63 mol) and second part of isophtalic acid (162.62 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. before discharging it onto an aluminum foil kept at room temperature.

Example 2: Synthesis of the Polyester and Preparation of the Resin Composition CompRC2

To a reactor (6.0 L) fitted with a thermometer, a stirrer and a distillation device was added a tin-based catalyst, neopentyl glycol (1408.97 g, 13.53 mol), diethylene glycol (214.06 g, 2.02 mol) and glycerol (60.58 g, 0.66 mol). The vessel was heated up to 150° C. until the mixture was molten. Then terephthalic acid (2718.20 g, 16.36 mol) was added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (181.75 g, 1.24 mol) for the second stage was added. The temperature was raised to 240-250° C. while distilling of water. In the final stage reduced pressure was applied until the polyester reached the desired acid number (35.0 mg KOH/g). Vacuum was stopped and the polyester was cooled down to 195° C. before discharging it onto an aluminum foil kept at room temperature.

Example 3: Synthesis of the Polyester and Preparation of the Resin Composition CompRC3

To a reactor (6.0 L) fitted with a thermometer, a stirrer and a distillation device was added a tin-based catalyst, neopentyl glycol (719.23 g, 6.91 mol), 1,2-propane diol (405.67 g, 5.33 mol), ethylene glycol (202.83 g, 3.27 mol), 1,6-hexanediol (162.27 g, 1.37 mol) and trimethylol propane (60.90 g, 0.45 mol). The vessel was heated up to 150° C. until the mixture was molten. Then terephthalic acid (2614.27 g, 15.74 mol) and isophtalic acid (40.57 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (252.07 g, 1.72 mol) and second part of isophtalic acid (165.45 g, 1.00 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. before discharging it onto an aluminum foil kept at room temperature.

Example 4: Synthesis of the Polyester and Preparation of the Resin Composition CompRC4

To a reactor (6.0 L) fitted with a thermometer, a stirrer and a distillation device was added a tin-based catalyst, neopentyl glycol (1459.59 g, 14.01 mol), ethylene glycol (115.02 g, 1.85 mol) and trimethylol propane (59.49 g, 0.44 mol). The vessel was heated up to 150° C. until the mixture was molten. Then terephthalic acid (2431.32 g, 14.64 mol) and isophtalic acid (63.46 g, 0.38 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (237.98 g, 1.63 mol) and second part of isophtalic acid (162.62 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (0.8% w/w based on the total weight of the polyester and the additives) and phosphonium containing agent (0.6% w/w based on the total weight of the polyester and the additives) were added to the polyester. Subsequently, the polyester was stirred for at least 20 minutes at 195° C. before discharging it onto an aluminum foil kept at room temperature.

Example 5: Synthesis of the Polyester and Preparation of the Resin Composition CompRC5

To a reactor (6.0 L) fitted with a thermometer, a stirrer and a distillation device was added a tin-based catalyst, neopentyl glycol (1389.24 g, 13.34 mol), diethylene glycol (211.07 g, 1.99 mol) and glycerol (59.74 g, 0.65 mol). The vessel was heated up to 150° C. until the mixture was molten. Then terephthalic acid (2680.14 g, 16.13 mol) was added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (179.21 g, 1.23 mol) for the second stage was added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (0.8% w/w based on the total weight of the polyester and the additives) and phosphonium containing agent (0.6% w/w based on the total weight of the polyester and the additives) were added to the polyester.

Subsequently, the polyester was stirred for at least 20 minutes at 195° C. before discharging it onto an aluminum foil kept at room temperature.

Examples 6: Synthesis of the Polyester and Preparation of the Resin Composition CompRC6

To a reactor (6.0 L) fitted with a thermometer, a stirrer and a distillation device was added a tin-based catalyst, neopentyl glycol (709.16 g, 6.81 mol), 1,2-propane diol (400.00 g, 5.26 mol), ethylene glycol (200.00 g, 3.22 mol), 1,6-hexanediol (160.00 g, 1.35 mol) and trimethylol propane (60.05 g, 0.45 mol). The vessel was heated up to 150° C. until the mixture was molten. Then terephthalic acid (2577.67 g, 15.52 mol) and isophtalic acid (40.00 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (248.54 g, 1.70 mol) and second part of isophtalic acid (163.13 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (1.4% w/w based on the total weight of the polyester and the additives) was added to the polyester. Subsequently, the polyester was stirred for at least 20 minutes at 195° C. before discharging it onto an aluminum foil kept at room temperature.

Examples 7: Synthesis of the Polyesters and Preparation of the Resin Composition RC7

To a reactor (6.0 L) fitted with a thermometer, a stirrer and a distillation device was added a tin-based catalyst, neopentyl glycol (709.16 g, 6.81 mol), 1,2-propane diol (400.00 g, 5.26 mol), ethylene glycol (200.00 g, 3.22 mol), 1,6-hexanediol (160.00 g, 1.35 mol) and trimethylol propane (60.05 g, 0.45 mol). The vessel was heated up to 150° C. until the mixture was molten. Then terephthalic acid (2577.67 g, 15.52 mol) and isophtalic acid (40.00 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (248.54 g, 1.70 mol) and second part of isophtalic acid (163.13 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. A phosphonium containing agent (1.4% w/w based on the total weight of the polyester and the additives) was added to the polyester. Subsequently, the polyester was stirred for at least 20 minutes at 195° C. before discharging it onto an aluminum foil kept at room temperature.

Example 8: Synthesis of the Polyester and Preparation of the Resin Composition RC8

To a reactor (6.0 L) fitted with a thermometer, a stirrer and a distillation device was added a tin-based catalyst, neopentyl glycol (1208.83 g, 11.61 mol), 1,2-propane diol (200.15 g, 2.63 mol), 1,6-hexanediol (200.13 g, 1.69 mol) and trimethylol propane (48.28 g, 0.36 mol). The vessel was heated up to 150° C. until the mixture was molten. Then terephthalic acid (2452.75 g, 14.76 mol) and isophtalic acid (40.96 g, 0.25 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (236.50 g, 1.62 mol) and second part of isophtalic acid (155.53 g, 0.94 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. A phosphonium containing agent (1.0% w/w based on the total weight of the polyester and the additives) were added to the polyester. Subsequently, the polyester was stirred for at least 20 minutes at 195° C. before discharging it onto an aluminum foil kept at room temperature.

Example 9: Synthesis of the Polyester and Preparation of the Resin Composition RC9

To a reactor (6.0 L) fitted with a thermometer, a stirrer and a distillation device was added a tin-based catalyst, neopentyl glycol (955.98 g, 9.18 mol), 1,2-propane diol (403.52 g, 5.30 mol), 1,6-hexanediol (201.76 g, 1.71 mol) and trimethylol propane (47.93 g, 0.36 mol). The vessel was heated up to 150° C. until the mixture was molten. Then terephthalic acid (2488.86 g, 14.98 mol) and isophtalic acid (40.65 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (239.98 g, 1.64 mol) and second part of isophtalic acid (157.51 g, 0.95 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (0.8% w/w based on the total weight of the polyester and the additives) and a phosphonium containing agent (0.6% w/w based on the total weight of the polyester and the additives) were added to the polyester. Subsequently, the polyester was stirred for at least 20 minutes at 195° C. before discharging it onto an aluminum foil kept at room temperature.

Example 10: Synthesis of the Polyester and Preparation of the Resin Composition RC10

To a reactor (6.0 L) fitted with a thermometer, a stirrer and a distillation device was added a tin-based catalyst, neopentyl glycol (723.26 g, 6.94 mol), 1,2-propane diol (401.30 g, 5.27 mol), ethylene glycol (200.07 g, 3.22 mol), 1,6-hexanediol (160.06 g, 1.35 mol) and trimethylol propane (47.30 g, 0.35 mol). The vessel was heated up to 150° C. until the mixture was molten. Then terephthalic acid (2574.18 g, 15.49 mol) and isophtalic acid (40.00 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (246.22 g, 1.68 mol) and second part of isophtalic acid (162.92 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (0.8% w/w based on the total weight of the polyester and the additives) and a phosphonium containing agent (0.6% w/w based on the total weight of the polyester and the additives) were added to the polyester. Subsequently, the polyester was stirred for at least 20 minutes at 195° C. before discharging it onto an aluminum foil kept at room temperature.

Examples 11: Synthesis of the Polyester and Preparation of the Resin Compositions RC11

To a reactor (6.0 L) fitted with a thermometer, a stirrer and a distillation device was added a tin-based catalyst, neopentyl glycol (709.16 g, 6.81 mol), 1,2-propane diol (400.00 g, 5.26 mol), ethylene glycol (200.00 g, 3.22 mol), 1,6-hexanediol (160.00 g, 1.35 mol) and trimethylol propane (60.05 g, 0.45 mol). The vessel was heated up to 150° C. until the mixture was molten. Then terephthalic acid (2577.67 g, 15.52 mol) and isophtalic acid (40.00 g, 0.24 mol) were added and under a nitrogen flow the temperature was gradually increased to 260° C. while distilling of the reaction water until the acid number of the precursor of the polyester was below 20 mg KOH/g. The reaction mixture was cooled to 220° C. and subsequently the adipic acid (248.54 g, 1.70 mol) and second part of isophtalic acid (163.00 g, 0.98 mol) for the second stage were added. The temperature was raised to 240-250° C. while distilling of water. In the final stage reduced pressure was applied until the polyester reached the desired acid number (35.0 mg KOH/g). Vacuum was stopped and the polyester was cooled down to 195° C. An amine containing agent (0.8% w/w based on the total weight of the polyester and the additives) and a phosphonium containing agent (0.6% w/w based on the total weight of the polyester and the additives) were added to the polyester. Subsequently, the polyester was stirred for at least 20 minutes at 195° C. before discharging it onto an aluminum foil kept at room temperature.

TABLE 1

Composition and properties of the polyesters used in resin compositions CompRC1-CompRC6 and RC7-RC11.

| | | 1 | 2 | 3 | 4 | 5 | 6 | 7 | 8 | 9 | 10 | 11 |
|---|---|---|---|---|---|---|---|---|---|---|---|---|
| | | | | | | RESIN COMPOSITION | | | | | | |
| | | CompRC1 | CompRC2 | CompRC3 | CompRC4 | CompRC5 | CompRC6 | RC7 | RC8 | RC9 | RC10 | RC11 |
| | Monomer | | | | | | | | | | | |
| FIRST PHASE | 2,2-dimethyl-1,3-propanediol (Neopentyl glycol) (% mol) | 41.30 | 40.01 | 19.17 | 41.30 | 40.01 | 19.16 | 19.16 | 34.28 | 26.71 | 19.53 | 19.17 |
| | 1,2-Propane diol (% mol) | | | 14.80 | | | 14.80 | 14.80 | 7.77 | 15.43 | 14.84 | 14.80 |
| | 1,6-Hexanediol (% mol) | | | 3.81 | | | 3.81 | 3.81 | 5.00 | 4.97 | 3.81 | 3.81 |
| | 1,2-Ethane diol (Ethylene glycol) (% mol) | 5.46 | | 9.07 | 5.46 | | 9.07 | 9.07 | | | 9.07 | 9.07 |
| | 2,2'-Oxy-bisethanol (Diethylene glycol) (% mol) | | 5.97 | | | 5.97 | | | | | | |
| | 1,2,3-Propane-triol (Glycerol) (% mol) | | 1.95 | | | 1.95 | | | | | | |
| | 2-ethyl-2-hydroxymethyl-1,3-propanediol (Trimethylol propane) (% mol) | 1.31 | | 1.26 | 1.31 | | 1.26 | 1.26 | 1.06 | 1.04 | 0.99 | 1.26 |
| | Terephthalic acid (% mol) | 43.13 | 48.39 | 43.67 | 43.13 | 48.39 | 43.67 | 43.67 | 43.61 | 43.60 | 43.59 | 43.67 |
| | Isophthalic acid (% mol) | 1.13 | | 0.68 | 1.13 | | 0.68 | 0.68 | 0.73 | 0.71 | 0.68 | 0.68 |
| SECOND PHASE | Isophthalic acid (% mol) | 2.88 | | 2.76 | 2.88 | | 2.76 | 2.76 | 2.77 | 2.76 | 2.76 | 2.76 |
| | Adipic acid (% mol) | 4.80 | 3.68 | 4.79 | 4.80 | 3.68 | 4.79 | 4.79 | 4.78 | 4.78 | 4.74 | 4.79 |
| | Hexadecyl-dimethylamine (Armeen 2M16D) (tertiary amine) (% w/w) | | | | 0.80 | 0.80 | 1.40 | | 0.80 | 0.80 | 0.80 | |
| | Triphenyl Ethyl Phosphonium Bromide (Phosphonium salt) (% w/w) | | | | 0.60 | 0.60 | | 1.40 | 1.00 | 0.60 | 0.60 | 0.60 |

TABLE 1-continued

Composition and properties of the polyesters used in resin compositions CompRC1-CompRC6 and RC7-RC11.

| | 1 | 2 | 3 | 4 | 5 | 6 | 7 | 8 | 9 | 10 | 11 |
|---|---|---|---|---|---|---|---|---|---|---|---|
| | | | | | RESIN COMPOSITION | | | | | | |
| | CompRC1 | CompRC2 | CompRC3 | CompRC4 | CompRC5 | CompRC6 | RC7 | RC8 | RC9 | RC10 | RC11 |
| Properties of the Polyester of the Resin Composition | | | | | | | | | | | |
| $M_n$ (theoretical value) (g/mol) | 3848 | 4168 | 3848 | 3848 | 4168 | 3848 | 3848 | 3687 | 3687 | 3687 | 3848 |
| Functionality (theoretical value) | 2.4 | 2.6 | 2.4 | 2.4 | 2.6 | 2.4 | 2.4 | 2.3 | 2.3 | 2.3 | 2.4 |
| $T_g$ (° C.) | 51.8 | 53.5 | 51.9 | 51.8 | 53.5 | 51.5 | 52.9 | 48.5 | 50.0 | 51.0 | 51.9 |
| Viscosity (Pa · s) @ 160° C. | 33.4 | 41.9 | 27.1 | 33.4 | 41.9 | 23.3 | 28.3 | 26.7 | 21.7 | 26.4 | 27.1 |
| AV (mg KOH/g polyester) | 34.5 | 35.6 | 34.5 | 34.5 | 35.6 | 35.7 | 36.0 | 34.4 | 34.5 | 33.0 | 34.5 |

Examples 12-24: Preparation of Thermosetting Powder Coating Compositions

Preparation of Thermosetting Powder Coating Compositions CompPCC1-CompPCC6 and PCC7-PCC13: Chemicals Used and General Procedure The chemicals used to prepare the thermosetting powder coating compositions CompPCC1-CompPCC6 and PCC7-PCC13 in the following examples are described in Table 2. Araldite®GT7004 (EEW=714-752) is an epoxy crosslinker from Huntsman, D.E.R. 662® (EEW=590-630) is an epoxy crosslinker from DOW, Kronos® 2160 is titanium dioxide from Kronos Titan GmbH, Resiflow® PV-5 is a flow control agent from Worlée-Chemie GmbH. Benzoin is used as degassing agent.

The thermosetting powder coating compositions were prepared by mixing the components presented in Table 2 in a blender, which components were subsequently extruded in a PRISM TSE16 PC twin screw at 100° C. with a screw speed of 400 rpm. The extrudate was allowed to cool to room temperature and broken into chips. These chips were then grinded in an ultra-centrifugal mill at 18000 rpm and sieved in a Retsch ZM100 sieve. The sieve fraction with particle size below 90 μm was collected and used for further experiments.

TABLE 2

Composition of thermosetting powder coating compositions CompPCC1-CompPCC6 and PCC7-PCC13.

| | 12 | 13 | 14 | 15 | 16 | 17 | 18 |
|---|---|---|---|---|---|---|---|
| | | | | POWDER COATING COMPOSITION | | | |
| | CompPCC1 | CompPCC2 | CompPCC3 | CompPCC4 | CompPCC5 | CompPCC6 | PCC7 |
| Resin Composition & weight (g) | CompRC1 210.00 | CompRC2 210.00 | CompRC3 216.00 | CompRC4 216.00 | CompRC5 216.00 | CompRC6 216.00 | RC7 216.00 |
| Crosslinker (DOW - D.E.R. 662) (g) | | | 84.00 | 84.00 | 84.00 | 84.00 | 84.00 |
| Crosslinker (Araldite GT-7004) (g) | 90.00 | 90.00 | | | | | |
| Kronos ® 2160 (g) | 150 | 150 | 150 | 150 | 150 | 150 | 150 |
| Resiflow ® PV 5 (g) | 4.5 | 4.5 | 4.5 | 4.5 | 4.5 | 4.5 | 4.5 |
| Benzoin (g) | 2.25 | 2.25 | 2.25 | 2.25 | 2.25 | 2.25 | 2.25 |
| Properties of the Thermosetting Powder Coating Composition | | | | | | | |
| Storage stability after 28 days at 40° C. (1-10, 10 best) | 6 | 5 | 7 | 6 | 5 | 7 | 7 |

| | 19 | 20 | 21 | 22 | 23 | 24 |
|---|---|---|---|---|---|---|
| | | | POWDER COATING COMPOSITION | | | |
| | PCC8 | PCC9 | PCC10 | PCC11 | PCC12 | PCC13 |
| Resin Composition & weight (g) | RC8 219.00 | RC9 219.00 | RC10 219.00 | RC10 216.00 | RC10 210.00 | RC10 216.00 |
| Crosslinker (DOW - D.E.R. 662) (g) | 81.00 | 81.00 | 81.00 | 84.00 | | 84.00 |

TABLE 2-continued

Composition of thermosetting powder coating compositions CompPCC1-CompPCC6 and PCC7-PCC13.

|  |  |  |  |  |  |  |
|---|---|---|---|---|---|---|
| Crosslinker (Araldite GT-7004) (g) |  |  |  |  | 90.00 |  |
| Kronos ® 2160 (g) | 150 | 150 | 150 | 150 | 150 | 150 |
| Resiflow ® PV 5 (g) | 4.5 | 4.5 | 4.5 | 4.5 | 4.5 | 4.5 |
| Benzoin (g) | 2.25 | 2.25 | 2.25 | 2.25 | 2.25 | 2.25 |
| Properties of the Thermosetting Powder Coating Composition |  |  |  |  |  |  |
| Storage stability after 28 days at 40° C. (1-10, 10 best) | 6 | 6 | 7 | 7 | 7 | 7 |

Examples 25-37: Preparation of the Powder Coatings CompPC1-CompPC6 and PC7-PC13: General Procedure The thermosetting powder coating compositions CompPCC1-CompPCC6 and PCC7-PCC13 prepared in Examples 12-24 (Table 2) were electrostatically sprayed (corona, 60 kV) onto S-46 test panels to a coating thickness to suit each test mentioned herein and cured at 160° C. for 10 minutes in an air-circulation oven (Heraeus Instruments UT6120) affording white colored powder coatings.

As can be seen from the Examples in Table 3 in combination with the Examples in Table 1, only when a resin composition of the invention according to claim 1 is used to prepare a thermosetting powder coating composition, the latter is storage stable, it is low bake and in addition upon curing of said thermosetting powder coating compositions the resulting powder coatings have no blooming, have smoothness of at least PCI 2 have sufficient reverse impact resistance and a good degassing limit.

This can be seen by comparing comparative examples CompPC1-CompPC6 with the examples according to the

TABLE 3

Properties of the powder coatings CompPC1-CompPC6 and PC7-PC13 derived upon cure of the thermosetting powder coating compositions CompPCC1-CompPCC6 and PCC7-PCC13.

|  | 25 | 26 | 27 | 28 | 29 | 30 | 31 |
|---|---|---|---|---|---|---|---|
|  |  |  | POWDER COATING |  |  |  |  |
|  | CompPC1 | CompPC2 | CompPC3 | CompPC4 | CompPC5 | CompPC6 | PC7 |
| RIR of 160 inch/lbs @ 160° C./10 min for film thickness of 75 μm | Fail | Pass | Fail | Fail | Pass | Fail | Pass |
| Blooming assessment | No Blooming | Extensive Blooming | No Blooming | No Blooming | Extensive Blooming | No Blooming | No Blooming |
| Temperature range blooming occurred |  | 131°-152° C. |  |  | 128-152° C. |  |  |
| Smoothness (PCI) | 6 | 3 | 8 | 2 | 2 | 7 | 2 |
| Degassing Limit (μm) | >100 | >100 | >100 | >100 | >100 | >100 | >100 |
| Storage stability after 28 days at 40° C. (1-10, 10 best) of the corresponding thermosetting powder coating composition | 6 | 5 | 8 | 6 | 5 | 8 | 7 |
| Gloss 20°/60° | 95/100 | 93/98 | 97/100 | 89/96 | 85/97 | 93/97 | 90/98 |

|  | 32 | 33 | 34 | 35 | 36 | 37 |
|---|---|---|---|---|---|---|
|  |  |  | POWDER COATING |  |  |  |
|  | PC8 | PC 9 | PC10 | PC11 | PC12 | PC13 |
| RIR of 160 inch/lbs @ 160° C./10 min for film thickness of 75 μm | Pass | Pass | Pass | Pass | Pass | Pass |
| Blooming assessment | No Blooming | No Blooming | No Blooming | No Blooming | No Blooming | No Blooming |
| Temperature range blooming occurred |  |  |  |  |  |  |
| Smoothness (PCI) | 3 | 5 | 5 | 5 | 5 | 5 |
| Degassing Limit (μm) | >100 | >100 | >100 | >100 | >100 | >100 |
| Storage stability after 28 days at 40° C. (1-10, 10 best) of the corresponding thermosetting powder coating composition | 6 | 6 | 7 | 7 | 7 | 7 |
| Gloss 20°/60° | 90/97 | 92/98 | 93/98 | 90/96 | 95/99 | 90/96 | invention (PC7-PC13, Table 3 and taking into account their corresponding polyesters shown in Table 1).

The invention claimed is:
1. A resin composition comprising at least:
   (a) an organophosphorous compound; and
   (b) a branched amorphous carboxylic acid functional polyester, said polyester having a Tg of at least 40° C. as measured by Differential Scanning calorimetry at a heating rate of 5° C./min, wherein said polyester comprises polycondensed residues derived from at least the following monomers:
      bi) 8 to 40% mol of 2,2-dimethyl-1,3-propanediol;
      bii) 3 to 21% mol of a $C_3$ to $C_5$ aliphatic diol AD1 not including 2,2-dimethyl-1,3-propanediol, wherein the $C_3$ to $C_5$ aliphatic diol AD1 is a saturated diol having only hydrogen carbon bonds, carbon carbon single bonds and two hydroxyl groups which are each attached to a carbon atom;
      biii) 1 to 10% mol of a $C_6$ to $C_{50}$ aliphatic or cycloaliphatic diol AD2;
      biv) 0.5 to 10% mol of an at least trifunctional monomer;
      bv) 10 to 55% mol of terephthalic acid; wherein
      the % mol is based on the polyester, and wherein
      the molar ratio of AD1 to AD2 (=mol AD1/mol AD2) in the polyester is at least equal or higher to 1 and at most equal to 10, and wherein
      the polyester has:
      an acid value (AV) as measured titrimetrically according to the ISO 2114-2000, between 14 and 120 mg KOH/g polyester, and
      a hydroxyl value (OHV) as measured titrimetrically according to the ISO 4629-1978, less than 13 mg KOH/g polyester, and
      a viscosity measured at 160° C. using as a cone and plate rheometer the Brookfield CAP 2000+, with spindle CAP-S-05 at 21 rpm (shear rate 70 s-1) of at most 150 Pa·s.
2. The composition according to claim 1, wherein the polyester comprises 8 to 35% mol of 2,2-dimethyl-1,3-propanediol.
3. The composition according to claim 1, wherein the polyester comprises 32 to 55% mol of terephthalic acid.
4. The composition according to claim 1, wherein the polyester further comprises 2 to 15% mol of adipic acid.
5. The composition according to claim 1, wherein said composition also comprises a tertiary amine and/or a quaternary ammonium salt.
6. The composition according to claim 5, wherein the tertiary amine is selected from the group consisting of octyldimethylamine, decyldimethylamine, dodecyldimethylamine, tetradecyldimethylamine, hexadecyldimethylamine, octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine and mixtures thereof.
7. The composition according to claim 1, wherein the organophosphorous compound is selected from the group of phosphonium salts having at least one phosphorous carbon bond and/or organophosphines having at least one phosphorous carbon bond.
8. The composition according to claim 7, wherein the resin composition further comprises: c) a tertiary amine and/or an amine salt and wherein the tertiary amine is selected from the group consisting of octyldimethylamine, decyldimethylamine, dodecyldimethylamine, tetradecyldimethylamine, hexadecyldimethylamine, octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine and mixtures thereof.
9. The composition according to claim 1, wherein the resin composition further comprises: c) a tertiary amine and/or an amine salt.
10. The composition according to claim 9, wherein the tertiary amine is selected from the group consisting of octyldimethylamine, decyldimethylamine, dodecyldimethylamine, tetradecyldimethylamine, hexadecyldimethylamine, octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine and mixtures thereof.
11. The composition according to claim 1, wherein the amount of organophosphorous compound; and any tertiary amine and/or quaternary ammonium salt present is in the range of from at least 0.1 to at most 5% w/w based on the total weight of polyester and organophosphorous compound; and any tertiary amine and/or quaternary ammonium salt present.
12. The composition according to claim 1, wherein the organophosphorous compound is selected from the group of phosphonium salts having at least one phosphorous carbon bond and/or organophosphines having at least one phosphorous carbon bond, and wherein the resin composition further comprises: c) a tertiary amine and/or an amine salt and wherein the tertiary amine is selected from the group consisting of octyldimethylamine, decyldimethylamine, dodecyldimethylamine, tetradecyldimethylamine, hexadecyldimethylamine, octadecyldimethylamine, didodecylmonomethylamine, ditetradecylmonomethylamine, dihexadecylmonomethylamine, di-tallow alkylmonomethylamine, (hydrogenated tallow alkyl)-dimethylamine, trioctylamine, tridecylamine, tridodecylamine and mixtures thereof, and wherein the amount of organophosphorous compound; and any tertiary amine and/or quaternary ammonium salt present is in the range of from at least 0.1 to at most 5% w/w based on the total weight of polyester and organophosphorous compound; and any tertiary amine and/or quaternary ammonium salt present.
13. A thermosetting powder coating composition comprising a resin composition as defined in claim 12 and a crosslinker having functional groups that are reactive with the carboxylic acid groups of the polyester.
14. A thermosetting powder coating composition comprising a resin composition as defined in claim 1 and a crosslinker having functional groups that are reactive with the carboxylic acid groups of the polyester.
15. A process for the preparation of the thermosetting powder coating composition as defined in claim 14, comprising the steps of:
   (a) mixing the resin composition comprising the organophosphorous compound and the branched amorphous carboxylic acid functional polyester with a crosslinker having functional groups that are reactive with the carboxylic acid groups of the polyester of the resin composition, to obtain a premix;
   (b) heating the obtained premix in an extruder, to obtain an extrudate;
   (c) cooling down the extrudate obtained in step b) to obtain a solidified extrudate;

(d) grinding the obtained solidified extrudate into smaller particles to obtain the thermosetting powder coating composition and classifying the thus prepared powder particles via a sieve and collecting a sieve fraction with particle size below 130 μm.

16. A process for forming a coating on a substrate comprising the steps of applying a composition as defined in claim 14 onto the substrate and curing the composition to form the coating.

17. A powder coating prepared by partial or full cure of a thermosetting powder coating composition according to claim 14.

18. A coated substrate comprising a coating derived upon curing of a composition as defined in claim 14.

19. A resin composition comprising at least:
   (a) 0.1 to 2% w/w of a quaternary phosphonium salt; and
   (b) a branched amorphous carboxylic acid functional polyester, said polyester having a Tg of at least 40° C. as measured by Differential Scanning Calorimetry at a heating rate of 5° C./min, wherein said polyester comprises polycondensed residues derived from at least the following monomers:
      bi) 18 to 35% mol of 2,2-dimethyl-1,3-propanediol;
      bii) 5 to 17% mol of 1,2-propane diol as diol AD1;
      biii) 3 to 7% mol of 1,6-hexanediol as diol AD2;
      biv) 0.5 to 2% mol of trimethylol propane as a trifunctional monomer; and
      bv) 32 to 45% mol of terephthalic acid; wherein
   the % w/w is based on the total weight of the polyester and the quaternary phosphonium salt, and wherein
   the % mol is based on the polyester, and wherein
   the molar ratio of AD1 to AD2 (=mol AD1/mol AD2) in the polyester is at least equal or higher to 1 and at most equal to 10, and wherein
   the polyester has:
      an acid value (AV) as measured titrimetrically according to the ISO 2114-2000, between 14 and 120 mg KOH/g polyester, and
      a hydroxyl value (OHV) as measured titrimetrically according to the ISO 4629-1978, less than 13 mg KOH/g polyester, and
      a viscosity measured at 160° C. using as a cone and plate rheometer the Brookfield CAP 2000+, with spindle CAP-S-05 at 21 rpm (shear rate 70 s$^{-1}$) of at most 150 Pa·s.

20. A resin composition according to claim 19, wherein the quaternary phosphonium salt is triphenyl ethyl phosphonium bromide.

21. A thermosetting powder coating composition comprising a resin composition as defined in claim 20 and a crosslinker having functional groups that are reactive with the carboxylic acid groups of the polyester.

22. A process for the preparation of the thermosetting powder coating composition as defined in claim 21, comprising the steps of:

(a) mixing the resin composition comprising the triphenyl ethyl phosphonium bromide and the branched amorphous carboxylic acid functional polyester with a crosslinker having functional groups that are reactive with the carboxylic acid groups of the polyester of the resin composition, to obtain a premix;
(b) heating the obtained premix in an extruder, to obtain an extrudate;
(c) cooling down the extrudate obtained in step b) to obtain a solidified extrudate;
(d) grinding the obtained solidified extrudate into smaller particles to obtain the thermosetting powder coating composition and classifying the thus prepared powder particles via a sieve and collecting a sieve fraction with particle size below 130 μm.

23. A process for forming a coating on a substrate comprising the steps of applying a composition as defined in claim 21 onto the substrate and curing the composition to form the coating.

24. A powder coating prepared by partial or full cure of a thermosetting powder coating composition according to claim 21.

25. A coated substrate comprising a coating derived upon curing of a composition as defined in claim 21.

26. A thermosetting powder coating composition comprising a resin composition as defined in claim 19 and a crosslinker having functional groups that are reactive with the carboxylic acid groups of the polyester.

27. A process for the preparation of the thermosetting powder coating composition as defined in claim 26, comprising the steps of:
(a) mixing the resin composition comprising the quaternary phosphonium salt and the branched amorphous carboxylic acid functional polyester with a crosslinker having functional groups that are reactive with the carboxylic acid groups of the polyester of the resin composition, to obtain a premix;
(b) heating the obtained premix in an extruder, to obtain an extrudate;
(c) cooling down the extrudate obtained in step b) to obtain a solidified extrudate;
(d) grinding the obtained solidified extrudate into smaller particles to obtain the thermosetting powder coating composition and classifying the thus prepared powder particles via a sieve and collecting a sieve fraction with particle size below 130 μm.

28. A process for forming a coating on a substrate comprising the steps of applying a composition as defined in claim 26 onto the substrate and curing the composition to form the coating.

29. A powder coating prepared by partial or full cure of a thermosetting powder coating composition according to claim 26.

30. A coated substrate comprising a coating derived upon curing of a composition as defined in claim 26.

\* \* \* \* \*